United States Patent
Wheals

(10) Patent No.: US 7,708,665 B2
(45) Date of Patent: May 4, 2010

(54) VARIABLE TORQUE BIASING DEVICE

(75) Inventor: Jonathan Charles Wheals, Warwickshire (GB)

(73) Assignee: Ricardo UK, Ltd., West Sussex (GB)

(*) Notice: Subject to any disclaimer, the term of this patent is extended or adjusted under 35 U.S.C. 154(b) by 571 days.

(21) Appl. No.: 11/658,164

(22) PCT Filed: Jul. 28, 2005

(86) PCT No.: PCT/GB2005/002956

§ 371 (c)(1),
(2), (4) Date: Jan. 22, 2007

(87) PCT Pub. No.: WO2006/010931

PCT Pub. Date: Feb. 2, 2006

(65) Prior Publication Data

US 2008/0300086 A1    Dec. 4, 2008

(30) Foreign Application Priority Data

| Jul. 30, 2004 | (GB) | 0417067.6 |
| Aug. 26, 2004 | (GB) | 0419056.7 |
| Nov. 19, 2004 | (GB) | 0425495.9 |

(51) Int. Cl.
F16H 37/08 (2006.01)
(52) U.S. Cl. ...................................... 475/205; 475/249
(58) Field of Classification Search ................. 475/198, 475/199, 204, 205, 206, 219, 221, 231, 248, 475/249
See application file for complete search history.

(56) References Cited

U.S. PATENT DOCUMENTS

2004/0029673 A1* 2/2004 Lipman ....................... 475/284
2006/0052198 A1* 3/2006 Namuduri et al. .............. 475/5

* cited by examiner

*Primary Examiner*—David D Le
(74) *Attorney, Agent, or Firm*—Dority & Manning, P.A.

(57) ABSTRACT

Various embodiments of a torque biasing device for a rotating transmission are operable to vary the proportion of the output torque transmitted to one or more output shafts. Multiple planetary gear sets are provided for speeding-up or slowing-down of one shaft with respect to another, under the control of a computer.

17 Claims, 18 Drawing Sheets

VARIABLE TORQUE BIASING DEVICE

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates to torque biasing devices, and particularly to such devices when applied to distribute torque between the wheels of a motor vehicle.

Torque biasing techniques are typically used in motor vehicles to increase the proportion of drive torque directed to one of two drive shafts. A device for varying left/right drive torque to wheels of a motor vehicle is described in EP-A-0575121. Such devices typically comprise epicyclic gear trains having control apparatus adapted to increase and/or reduce the speed of certain gear train elements, thereby to direct an increased proportion of torque to one drive shaft rather than another.

Controllable torque biasing devices are used in motor vehicles to influence traction and yaw stability by distributing drive torque in accordance with control algorithms associated with e.g. yaw rate, yaw acceleration and time derivatives of vehicle slip angle during cornering.

OBJECTS AND SUMMARY OF THE INVENTION

In vehicle applications, one important requirement is to ensure that component parts are as small as reasonably practicable in order to give maximum freedom to the vehicle designer. Furthermore, regard must be had to length/width ratios, mass, complexity of manufacture and assembly, inertia of rotating components and cooling.

According to a first aspect of the invention, there is provided a torque biasing device having an input, two outputs, and therebetween an epicyclic differential module comprising an annulus connectable to said input, a sun connectable to one of said outputs and a planet carrier connectable to the other of said outputs, said planet carrier having double planets operative in series between said annulus and sun, and said unit further comprising a gear module and a control module, said gear module comprising two epicyclic gear trains side by side and having suns joined for rotation in common, one annulus of the gear module being connected to the planet carrier of said differential module, and the other annulus of the gear module being connectable to one of said outputs, and the control module being adapted to change the speed of the carrier of the gear module, thereby to bias said differential module so as to provide in use more torque to one of said outputs than to the other.

In this specification reference to 'control' module includes reference to 'actuation' module.

According to a modification of the first aspect, the gear module may have annuluses linked for rotation in common, one sun being connected to the planet carrier of the differential module, and the other sun being connectable to one of said outputs.

Preferably the control module is adapted to both increase and decrease the speed of the carrier of the gear module. The control module may comprise a brake operable to retard the carrier of the gear module. The control module may comprise an epicyclic gear train having a sun connected to a brake, an annulus connected to the planet carrier of said gear module, and a planet carrier connectable to said input. In such an arrangement a single brake unit can be used to speed-up the planet carrier of the gear module.

Preferably one of said outputs is a shaft, and the suns of said gear module are co-axial therewith. The sun of said differential module may also be co-axial with the suns of the gear module.

In a preferred embodiment the other of said outputs is a shaft, and the outputs are co-axial, and oppositely directed.

The control module preferably includes an epicyclic gear train having a driving connection to one of said input and outputs.

In a preferred embodiment the control module comprises two independently operable brakes and an epicyclic control module train, the brakes being operable in direct and indirect modes, in direct mode one brake being connected to retard the carrier of said gear module, and in indirect mode the other brake being connected to speed up the carrier of said gear module via said epicyclic control module train.

In a first embodiment, the control module comprises an annulus connectable to said input, a sun connected to the carrier of said gear module, double planets and a planet carrier, wherein said brakes are connected one each to the planet carrier of the gear module and the planet carrier of the control module train.

In a second embodiment, the control module comprises a planet carrier connectable to said input a sun connected to one of said brakes and to the planet carrier of the gear module, and an annulus connected to the other of said brakes.

In a third embodiment, the control module comprises a planet carrier connectable to said input, a sun connected to one of said brakes, and an annulus connected to the other of said brakes and to the planet carrier of the gear module.

In a fourth embodiment the control module comprises an annulus connected to the planet carrier of the gear module and to one of said brakes, a sun connected to the other of said brakes, and a planet carrier connectable to one of said outputs.

In a fifth embodiment, the control module comprises a sun connected to the planet carrier of said gear module and to one of said brakes, an annulus connected to the other of said brakes, and a planet carrier connectable to one of said outputs.

In a sixth embodiment the control module comprises a brake and an epicyclic control module train comprising a carrier connectable to said input, an annulus connected to the carrier of said gear module, and a sun connected to said brake whereby said brake is operable in direct and indirect modes, in direct mode the brake being connected to retard the carrier of said gear module, and in indirect mode the brake being connected to speed up the carrier of said gear module via said epicyclic control module train.

In a seventh embodiment a second gear module is provided having two epicyclic gear trains side by side and having suns joined for rotation in common, one annulus of the second gear module being connectable to said input, and the other annulus of the second gear module being connectable to said one of said outputs, and the control module comprising a brake operable to directly retard one or other of the gear module planet carriers.

In a preferred embodiment the brake is connectable via two separately actuable digital clutches, one clutch being operatively on the input side of the carrier of said epicyclic control module train, and the other clutch being operatively on the brake side of the connection between the annulus of the epicyclic control module train and the carrier of the gear module. The unit may further include two torque limiting clutches, one each in series with said digital clutches. In this preferred embodiment the planet carrier of said epicyclic control module train may be radially outside the planet carrier of said gear module.

According to the invention, a transmission comprises a differential module, a gear module and a control module having a common axis of rotation, the modules being arranged in axial series with the gear module centremost. Preferably the modules comprise immediately adjacent epicyclic gears.

The first aspect of the invention concerns a transmission having a gear module with suns linked for rotation together.

In a second aspect of the invention, the annuluses are linked for rotation together, one sun being connected to the planet carrier of the differential module, and the other sun being connectable to one of said outputs. The control module acts on the planet carrier of the gear module in accordance with any of the embodiments described above.

In a third aspect of the invention, the planets of the gear module are linked for rotation together, one sun being connected to the planet carrier of the differential module and the other sun being connectable to one of said outputs. The control module acts on the planet carrier of the gear module in accordance with any of the embodiments described above.

According to a fourth aspect of the invention there is provided a torque biasing unit comprising a gear module having three epicyclic gear trains each comprising sun, planet, planet carrier and annulus; the members of one of the sun group and annulus group being linked for rotation in common; the members of the other of the sun group and annulus group providing respectively a first input, a second input and a first control element; the planet carriers being joined and providing a second control element; the first and second control elements being connectable to a control module having a speed control device; and the first input and second input being respectively adapted for connection to outputs of a differential gear.

According to a fifth aspect of the invention, the gear module of the fourth aspect may have planets linked for rotation together, the suns respectively providing said first input, said second input and said first control element, and the annuluses being omitted.

Preferably multiple side by side epicyclic gear trains are immediately adjacent.

The control module may comprise first and second brakes, or a single brake alternately connectable to the first and second control elements, or alternatively may comprise a rotatable device having the capability to both increase and decrease speed, such as a motor, preferably an electric motor. In one preferred embodiment a motor acts between the first and second control elements so as to increase or decrease the relative speed on demand.

Braking may be applied to both first and second control elements simultaneously in order to lock the transmission, and thereby provide a parking or emergency brake.

The differential gear is preferably an epicyclic differential having a common axis of rotation with said gear module. The differential gear preferably has oppositely directed output shafts on said axis of rotation.

The or each brake is preferably provided about said axis and includes at least one element rotatable on said axis. Two brakes may be provided in axial sequence along said axis, or one within the other about said axis. In the latter case the brakes may have a common grounding element therebetween.

A digital clutch is preferably provided in series with the or each brake. By digital clutch we mean a clutch having two states, namely engaged and disengaged. Such a clutch may be used to alternate connection of a single brake to one or other control element, or simply to break drive to any brake so as to eliminate internal drag or wear thereof.

According to a sixth aspect the invention provides a transmission providing on-demand transmission of torque from a driving axle to a normally undriven axle, the transmission comprising an input for connection to a driving axle, an output for on-demand connection to a driven axle and a gear module comprising two epicyclic gear trains side by side and rotatable about a common axis, the suns of the gear module being connected for rotation together, the annuluses being connectable one each to said input and said output, and a common planet carrier being connectable to a control module adapted to change the speed thereof.

In a preferred embodiment the control module includes a brake for on-demand retarding of the planet carrier whereby overspeeding of the rear axle is a consequence. Accordingly the rear axle of a front-wheel drive vehicle may receive an on-demand torque input to cause overspeeding thereof. This rear drive characteristics may be imparted to a vehicle having predominantly front drive characteristics.

According to a seventh aspect of the invention a transmission is provided with an input and an output whereby drive to the output is via a torque biasing module, the module comprising two epicyclic gear trains side by side, the suns of each gear train being linked for rotation together, one annulus being linked to the input and the other annulus being linked to the output, the planet carrier of the gear trains being common, and the transmission further including a brake for the planet carrier, whereby application of the brake permits drive between the input and the output.

Such a transmission can provide variable torque on demand from any motive power source to a torque user.

In an alternative embodiment, the input drives two outputs via respective torque biasing modules, each comprising two epicyclic gear trains side by side, the suns of each gear train being linked for rotation together, one annulus of each gear train being linked to the input, the other annulus of each gear train being linked to a respective output, and the common planet carrier of each gear train being linked to a respective brake whereby application of the brakes permits drive from the inputs to the outputs.

Such a transmission can provide drive to opposed wheels of an axle without the usual differential gear.

According to an eight aspect of the invention there is provided a transmission for transferring torque between two inputs, typically an undriven axle of a vehicle, the transmission comprising a gear module and a control module, the gear module comprising a two epicyclic gear trains side by side with annuluses linked for rotation in common, one sun of each epicyclic gear being linked to a respective input, and the planet carriers being joined, and the control module comprising an epicyclic gear train having an annulus linked to said linked annuluses, a sun linked to a first brake and a planet carrier linked to a second brake and to the planet carrier of the gear module, whereby application of the first brake results in transfer of drive torque from one input to the other input, and application of the second brake causes transfer of torque from said other input to said one input.

Preferably the inputs are drive shafts, and are co-axial. The epicyclic gear trains are preferably co-axial with the drive shafts.

In a first alternative to the eight aspect, the annuluses of the gear module are connected to the planet carrier of the control module, and the planet carrier of the gear module is connected to the annulus of the control module, the brakes being operable via the sun of the control module and directly on the planet carrier of the gear module.

In a second alternative the annuluses of the gear module are linked to respective inputs, and the suns of the gear module are linked for rotation together, the annulus of the control module being linked to the planet carrier of the gear module and to the first brake, the sun of the control module being linked to the second brake, and the planet carrier of the control module being linked to the common suns of the gear module.

In a third alternative the suns of the gear and control modules are linked for rotation together, the annuluses are connected respectively to the first input, the second input and to a first brake, and the planet carriers of the gear module and control module are linked and connected to a second brake.

Although the eight aspect and its alternatives have been described with a control module including an epicyclic gear, this gear could be incorporated as part of the gear module such that the control module comprises only brakes and the necessary mechanical drive connections.

According to a ninth aspect of the invention, a plurality of transmissions according to the previous aspects may be linked in cascading series, each transmission having an input and two outputs, and a plurality of outputs being inputs of the next transmission in the series.

Such an arrangement allows multiple outputs with individual torque biasing according to the torque input, and is suitable for example for all wheel drive vehicles, propulsion systems for ships and machine tools, and any device where input torque is required to be divided on-demand between multiple part or full-time users.

Application of the control (actuation) module to all embodiments is determined by an external computer in accordance with signals from vehicle and other sensors. These sensors may provide information relating to, for example, steering angle, yaw rate, wheel braking and wheel speed of the vehicle; and external information, for example relating to vehicle position (e.g. GPS) and road surface friction. Thus in use the computer will determine whether a wheel of the vehicle requires relative speeding-up or slowing down, and transmit a control signal to the torque biasing device so as to cause a vehicle response in accordance with a pre-defined algorithm, and an algorithm may be active and thus capable of continual change according to influencing factors. Several algorithms may of course be provided according to the required conditions of use. Torque input may be provided from a torque sensor at the or each speed adjusting device of the control module—thus each output may have a torque sensor to provide feedback.

Various kinds of brake are suitable for the control module. Multi-plate wet brakes having several interleaved disc-like members arranged about an axis of rotation are a preferred solution. Another preferred arrangement is to use a magneto-rheological brake in which the working fluid between relatively rotatable components can be stiffened, to cause drive therebetween—such a brake requires connection to a source of electric power, and thus avoids the complications inherent in hydraulic, pneumatic or mechanical actuation.

Conveniently, the brake assembly or other speed changing device is mounted about an axis of rotation of the transmission, and acts thereon via one or more axially extending connections, for example in the form of one or more sleeves. Endmost mounting of the brake assembly or other speed changing device is preferred so as to give ready access to the circumference and one annular end surface, for the purposes of power and control links.

Where two brakes are provided, they may be nested one within the other or arranged side by side. In both cases a common grounding element is preferably provided between the brakes. In the case of one brake and two digital clutches, the clutches may also be nested or arranged side by side, or housed within the cylindrical envelope of the brake.

According to a tenth aspect, the invention provides a magneto-rheological brake comprising a circular multi-plate pack of interleaved driving and grounding elements, the driving elements being adapted for driving from the radially inner side, and generating means for generating an electromagnetic field being provided at the radially outer side, a magneto-rheological fluid being provided between the plates and being adapted to provide drive therebetween on energization of said generating means.

Such an arrangement provides a compact brake adapted for positioning about a drive axis of a transmission. The torque capacity of such a brake can be readily increased by increasing the diameter of the elements, or adding elements in axial succession.

In a preferred embodiment the elements are annular and define a cylindrical inner space having therein a dual clutch, the clutch having a common output connected to said brake, and two inputs connectable alternately to respective rotatable driving members.

This arrangement provides a compact device for connecting and modulating the brake on-demand to one of two rotatable elements of a transmission, and is especially suitable for the torque biasing transmission described in this specification.

The clutches preferably comprise adjacent wrap spring clutches, each having a grounding member engageable on-demand to drive the common output. In the preferred embodiment the common output lies between symmetrical wrap spring clutches, and the driving members are tubular, co-axial and provided on one side.

The grounding members are preferably engaged by an electromagnetic device adapted to retard rotation of a free element of a wrap spring, as described further herein.

BRIEF DESCRIPTION OF THE DRAWINGS

Other features of the invention will be apparent from the following description of preferred embodiments shown by way of example only in the accompanying drawings in which:—

DETAILED DESCRIPTION OF THE PREFERRED EMBODIMENTS

Figure 1:
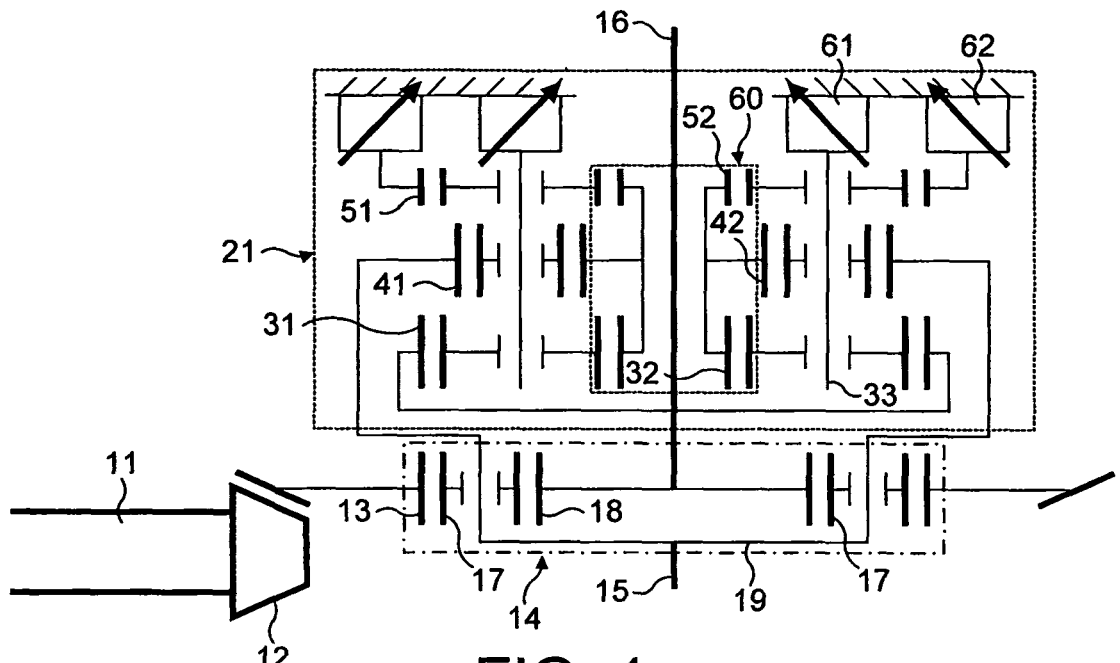
FIG. 1 is a schematic representation of a first embodiment of a torque biasing unit.

With reference to FIG. 1, an input shaft 11 has a bevel gear 12 driving an annulus 13 of an epicyclic differential gear generally indicated by chain-dot line 14. This differential gear 14 has opposite output shafts 15, 16 (which may be drive shafts of a vehicle axle). As illustrated, the annulus 13 drives via double planet gears 17 to a sun gear 18 which is coupled to one output shaft 16; the planet carrier 19 is coupled to the other output shaft 15.

A torque biasing unit, generally indicated by dotted line 21 comprises three epicyclic gear trains arranged side by side, and about the output shaft 16.

Each epicyclic train comprises annulus, planets, planet carrier and sun, and the elements of each train are connected in the following manner.

Output shaft 16 drives an annulus 31, and planet carrier 19 drives an annulus 41. The sun gears 32, 42, 52 are connected for rotation in common as represented by dotted line 60. A single planet carrier 33 is provided and coupled to a first brake 61. The third annulus 51 is connected to a second brake 62.

In use, the brakes 61, 62 may be applied alternately to cause speeding-up or slowing-down of one output shaft with respect to the other.

Figure 2:
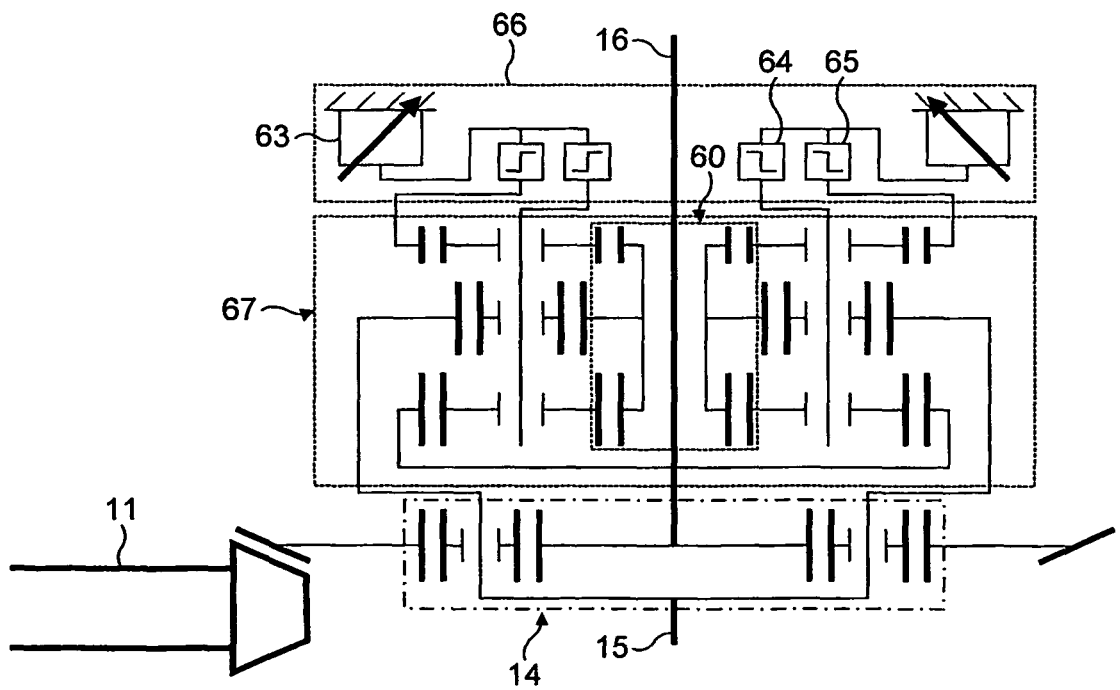
FIG. 2 is a schematic representation of a second embodiment of a torque biasing unit.

FIG. 2 shows the same gear arrangement as FIG. 1, but in this case a single brake 63 is connectable to the third annulus 51 or planet carrier 33 by means of a respective digital clutch 64, 65. These digital clutches are for example wrap spring clutches activated on demand by energization of an electrical coil, but any other suitable device may be employed. The brake 61, 62, 63 may be of any suitable kind, such as a multi-plate disc brake having a magneto-rheological fluid on working medium.

As illustrated in FIG. 2, the brake and digital clutch elements may be arranged as a brake module 66, which is convenient for manufacture and assembly to the differential module 14, and to an epicyclic gear module 67.

Operation of the embodiment of FIG. 2 is identical to that of FIG. 1, save that the appropriate digital clutch must be engaged to ground the respective element 51, 33.

Figure 3:
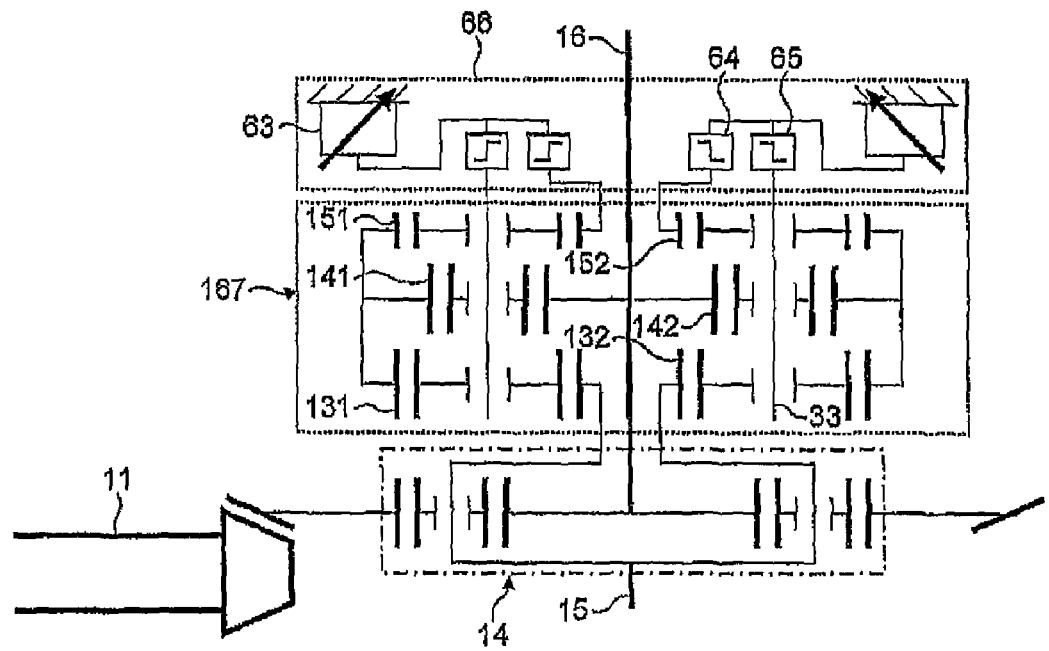
FIG. 3 is a schematic representation of a third embodiment of a torque biasing unit.

FIG. 3 illustrates another embodiment of the invention, in which the epicyclic gear module 167 comprises annuluses linked for rotation in common. Features common to the embodiments of FIGS. 1 and 2 carry the same reference numerals, whereas corresponding parts carry a reference numeral increased by 100.

The embodiment of FIG. 3 includes a differential module 14, and a brake module 66 as previously described.

The gear module 167, is similar to that illustrated in FIGS. 1 and 2, but the internal connections are different. In particular, the three annuluses 131, 141, 151 are connected as a unit, and the digital brakes 64, 65 are connected respectively to the common planet carrier 33, and to the third sun gear 152.

One output shaft 16 is connected to the second sun gear 142, whereas the other output shaft is connected (via the differential planet carrier 19) to the first sun gear 132.

Operation is as previously described, so that connection of the brake 63 via one or other digital clutches 64, 65 will cause relative speeding-up or slowing-down of one output shaft with respect to the other.

Figure 4:
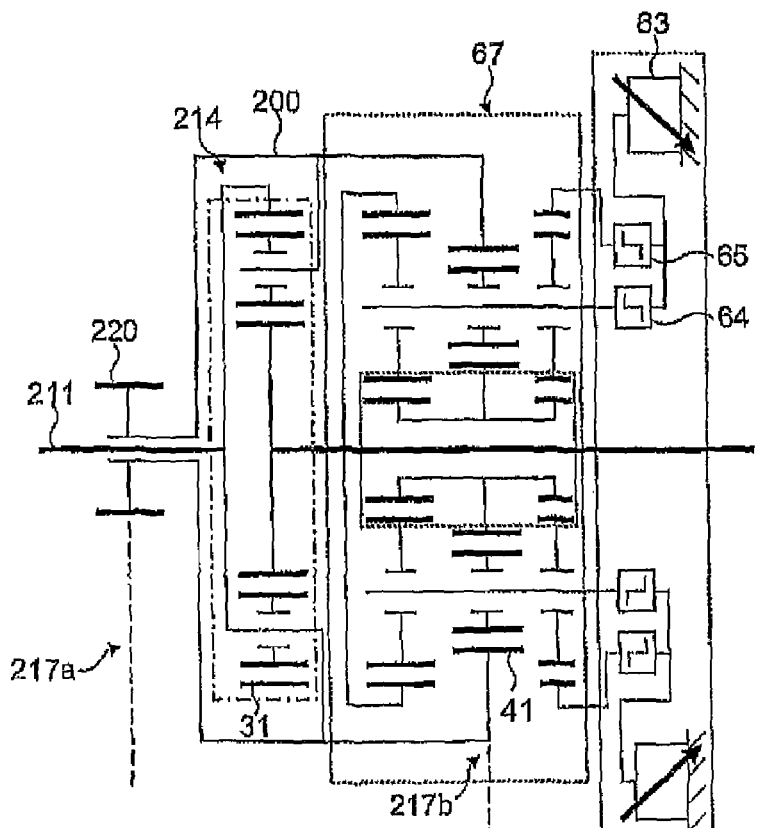
FIG. 4 is a schematic representation of a fourth embodiment of a torque biasing unit.

FIG. 4 illustrates an arrangement suitable for a centre mounted differential gear of a four wheel drive vehicle, and also suitable for operation between wheels of an axle. Common features again carry common reference numerals, and the illustrated arrangement corresponds closely to that of FIG. 2 (in which the suns are connected for rotation in common). Corresponding parts have reference numerals increased by 200.

An input shaft 211 drives a differential gear module 214, connected to which is an epicyclic gear module 67, and a brake module 66 comprising a brake 63 and digital clutches 64, 65.

The gear module is identical to that of FIG. 2, and has the same internal and external drive connections, as illustrated. One output shaft 16 (for example for a rear axle) passes co-axially through the modules 66, 67. The other output (for example for a front axle) can be taken from one of two locations 217a and 217b. In one arrangement 217a an output gear 220 is journalled about the input shaft 211 and is driven from the centre annulus 41 via a casing 200 of the differential module 214. It will be appreciated that output via the differential planet carrier is precluded because the input shaft 211 is connected to the differential annulus. Suitable gear and drive shaft connections transfer torque from gear 220 to the desired location.

However, because this drive output is external of the first annulus 31, it will also be appreciated that output drive may take from any suitable position along the external side of the epicyclic gear module 67; a suitable alternative location 217b is illustrated.

Operation of this embodiment is as previously described.

Figure 5:
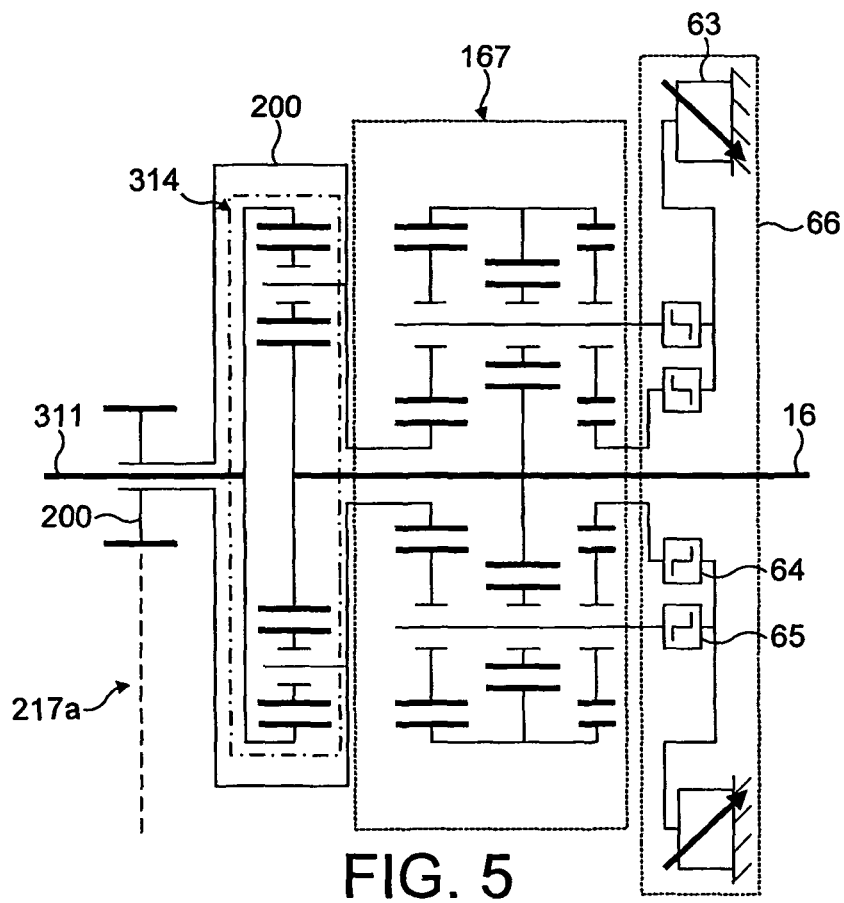
FIG. 5 is a schematic representation of a fifth embodiment of a torque biasing unit.

FIG. 5 illustrates an arrangement corresponding to FIG. 4, but having a common annulus arrangement as illustrated in FIG. 3. Common parts carry the same reference numeral whereas corresponding parts have reference numerals increased by 300.

The brake module 66 and gear module 167 are as described with reference to FIG. 3 and have the same internal and external connections. The annuluses are linked for rotation together.

The differential module 314 has the sun gear connected to an input shaft 311, and the carrier connected to the first sun gear of the gear module 167, as illustrated. One output shaft 16 is driven form the differential annulus. As in FIG. 3, the other output 217a requires to be driven from the differential planet carrier, and this is accomplished, as in the embodiment of FIG. 4, by driving via a differential casing 200 and an output gear 220, and thence via suitable gear and shaft connection from location 217a.

It will be appreciated that, although not illustrated, the same possibilities exist for an alternative drive location such as 217b of FIG. 4.

Figure 6:
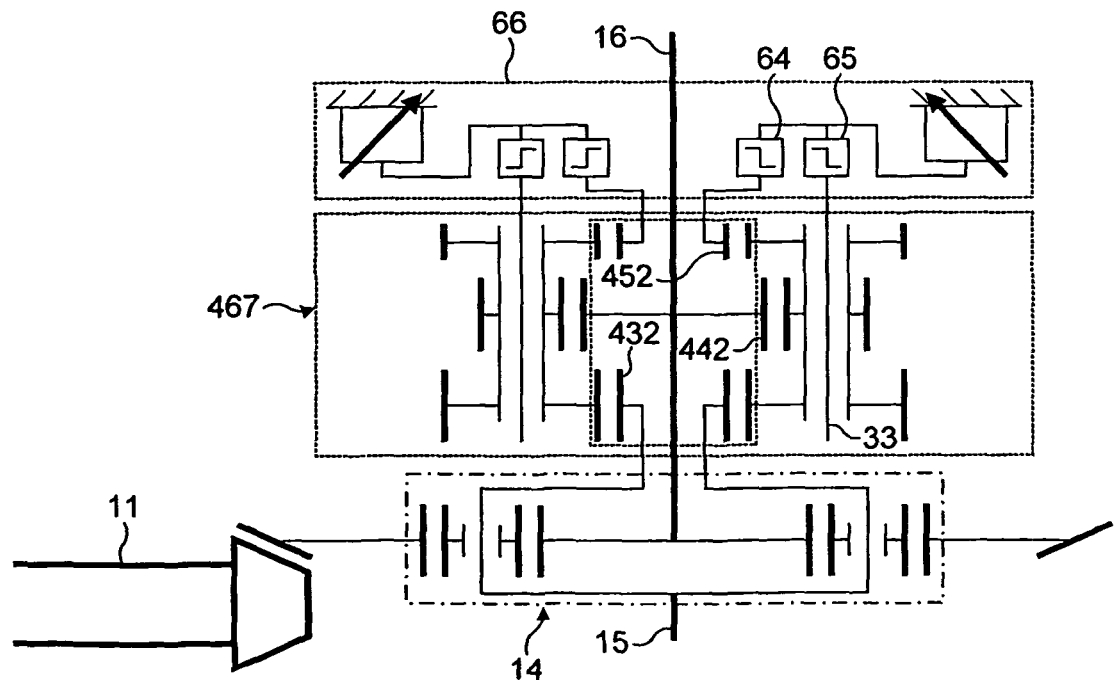
FIG. 6 is a schematic representation of a sixth embodiment of a torque biasing unit.
Figure 7:
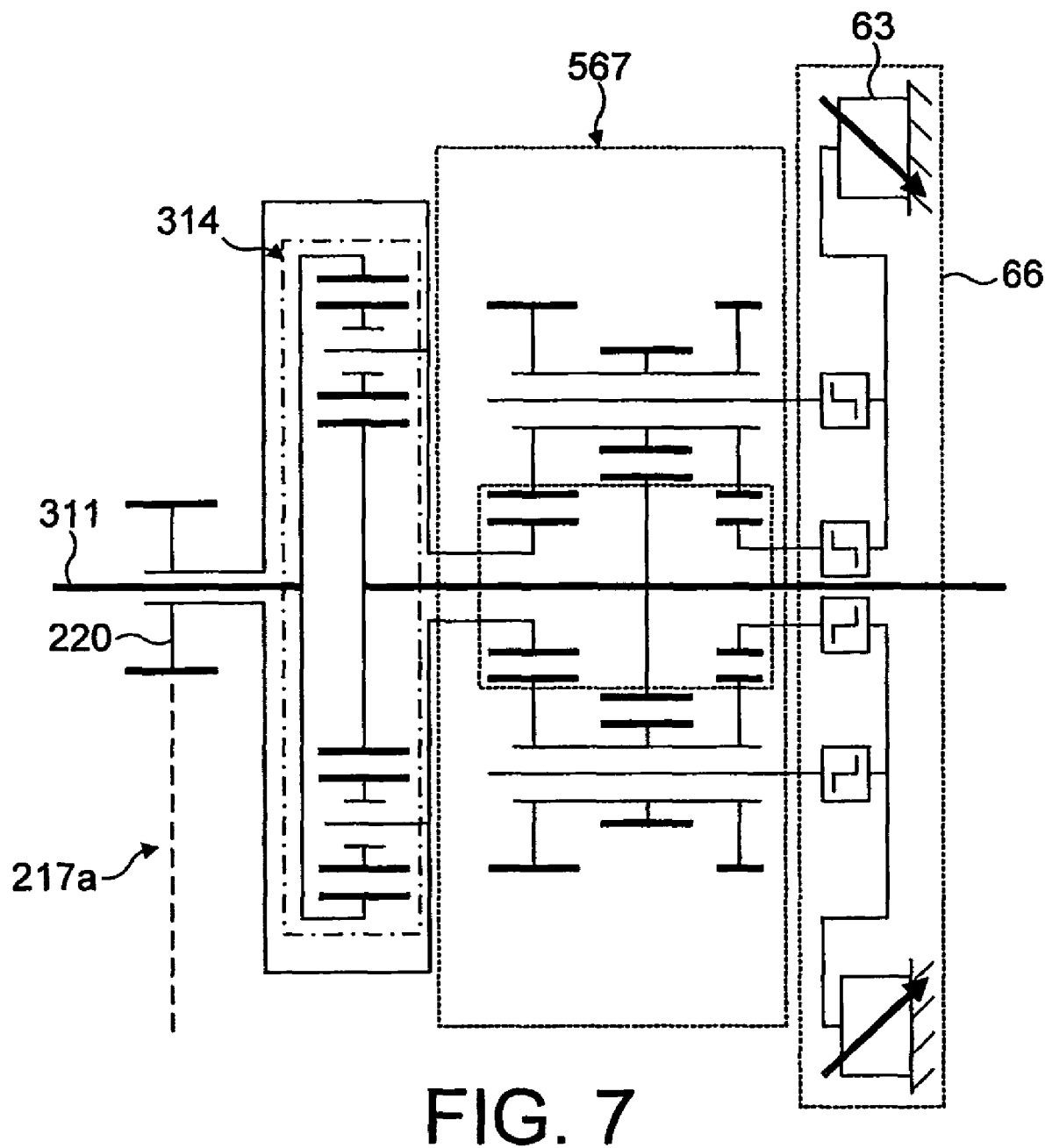
FIG. 7 is a schematic representation of a seventh embodiment of a torque biasing unit.

FIGS. 6 and 7 illustrate two alternative aspects of the invention, in which an epicyclic gear module does not have annuluses. The arrangement of FIG. 6 is similar in some respects to that of FIG. 3 and common parts carry the same reference numerals, corresponding parts have reference numerals increased by 400.

In FIG. 6, the differential and brake modules 14, 66 are identical to those of FIG. 3. A somewhat simplified epicyclic gear module 467 comprises three epicyclic gear trains arranged side by side, but without any annuluses. These three trains have a common planet carrier 33 connected to one digital clutch 65, the other digital clutch 64 being connected to the third sun gear 452.

The arrangement of FIG. 6 differs from that of FIG. 3 in that the planets are connected for rotation in common. Inputs to the gear module are as provided in FIG. 3, namely from output shaft 16 to the centre sun 442 and from output shaft 15 to the inner sun 432.

Once again, engagement of the brake via one or other digital clutches 64, 65 causes relative speeding-up or slowing-down of the output shafts 15, 16.

The embodiment of FIG. 7 corresponds to the embodiment of FIG. 6 as applied to the centre vehicle location of FIG. 5. Common parts have the same reference numerals; corresponding parts have numerals increased by 500. Like the embodiment of FIG. 6, the gear module 567 has no annuluses, but the planet gears are connected for rotation in common. The brake module 66 and differential module 314 are identical to those of FIG. 5.

Operation of the embodiment of FIG. 7 is the same as for FIG. 6 save for the centre location. Other possibilities for output location 217a are possible, as previously described.

Figure 8:
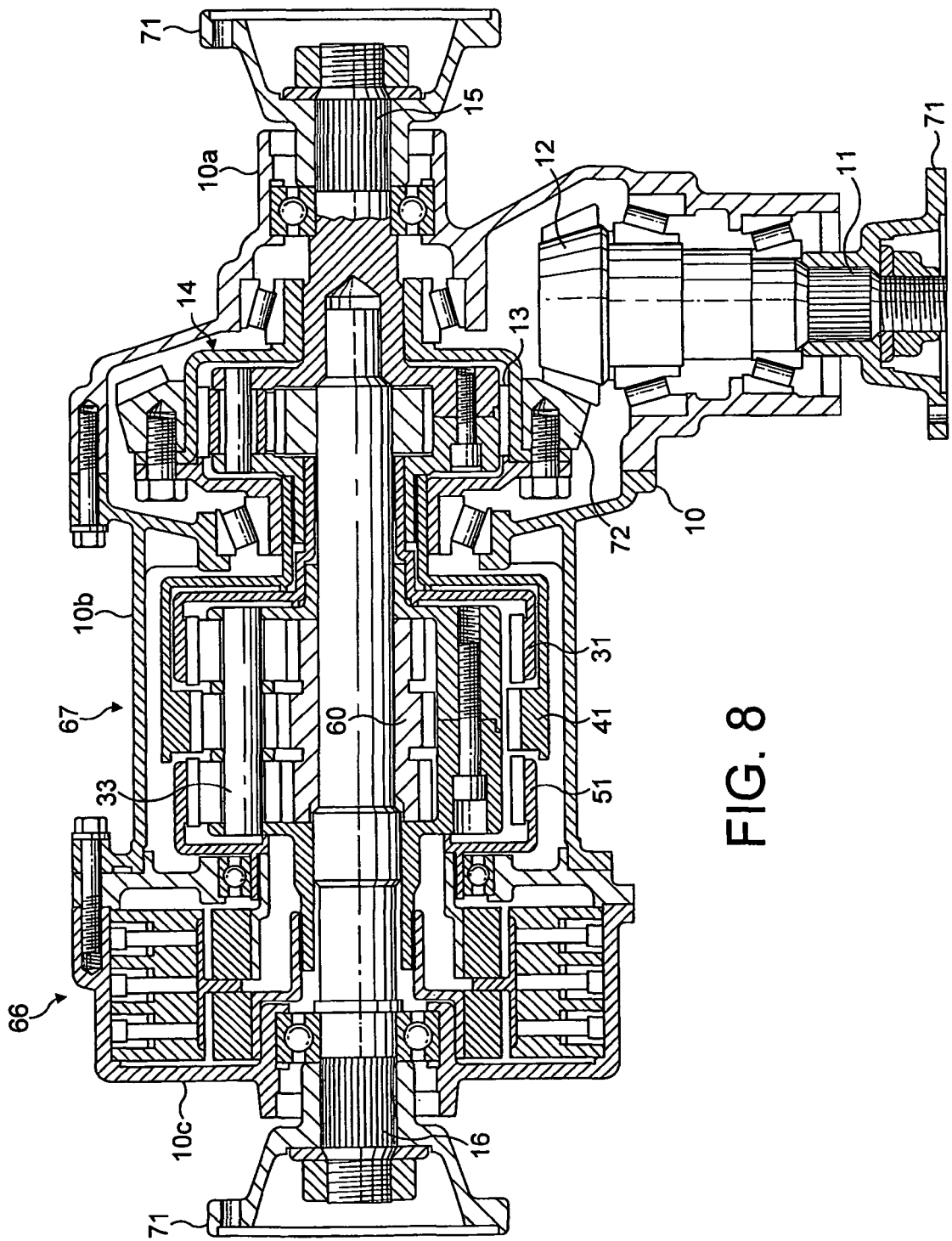
FIG. 8 is a transverse section through a transmission embodying the principles of the invention as illustrated in FIG. 1.

The transmission illustrated in FIG. 8 is a practical embodiment of the schematic arrangement shown in FIG. 1. The same parts are given identical reference numerals.

FIG. 8 shows a transmission casing 10 in which is journalled an input shaft 11 and two output shafts 15, 16; each shaft has a driven flange 71 fixed for rotation therewith, for example by splines. An input bevel gear 12 drives an output bevel gear 72 which is fast for rotation with the annulus 13 of an epicyclic differential 14.

Three epicyclic gear trains are arranged side by side as a module 67 about the output shaft 16, and have suns 60 linked for rotation in common. These gear trains lie between the differential 14 and a brake module 66 consisting of a magneto-rheological element which can be selectively engaged (via digital clutches) to ground the respective brake inputs to the transmission casing 10.

One digital clutch couples the brake to the common planet carrier 33 of the gear module 67, whereas the other digital clutch couples the brake to the annulus 51 of the adjacent epicyclic train. In the input side, the centre annulus 41 is driven from the output shaft 15, and the annulus 31 adjacent the differential gear 14 is driven from the output shaft 16.

Suitable support bearings (roller, ball or plain) are provided as necessary, and connections between adjacent components are typically by spline. As illustrated in the drawing, the casing 10 is comprised of three components 10a, 10b, 10c, which thus permits the modules 14, 67, 66 to be assembled and tested individually.

As illustrated in FIG. 8, the torque vectoring unit of the invention can be compact, and easily provided about one or other drive shaft of a vehicle axle. The unit is self-contained, and the brake module 66 is easily accessible from the exterior for connection of a suitable power supply. It will be appreciated that this module could incorporate hydraulic, electric, pneumatic or mechanical operation of the individual brakes, and the connection of suitable control mechanisms is facilitated by providing the brake module at the exterior of the transmission.

Figure 9:
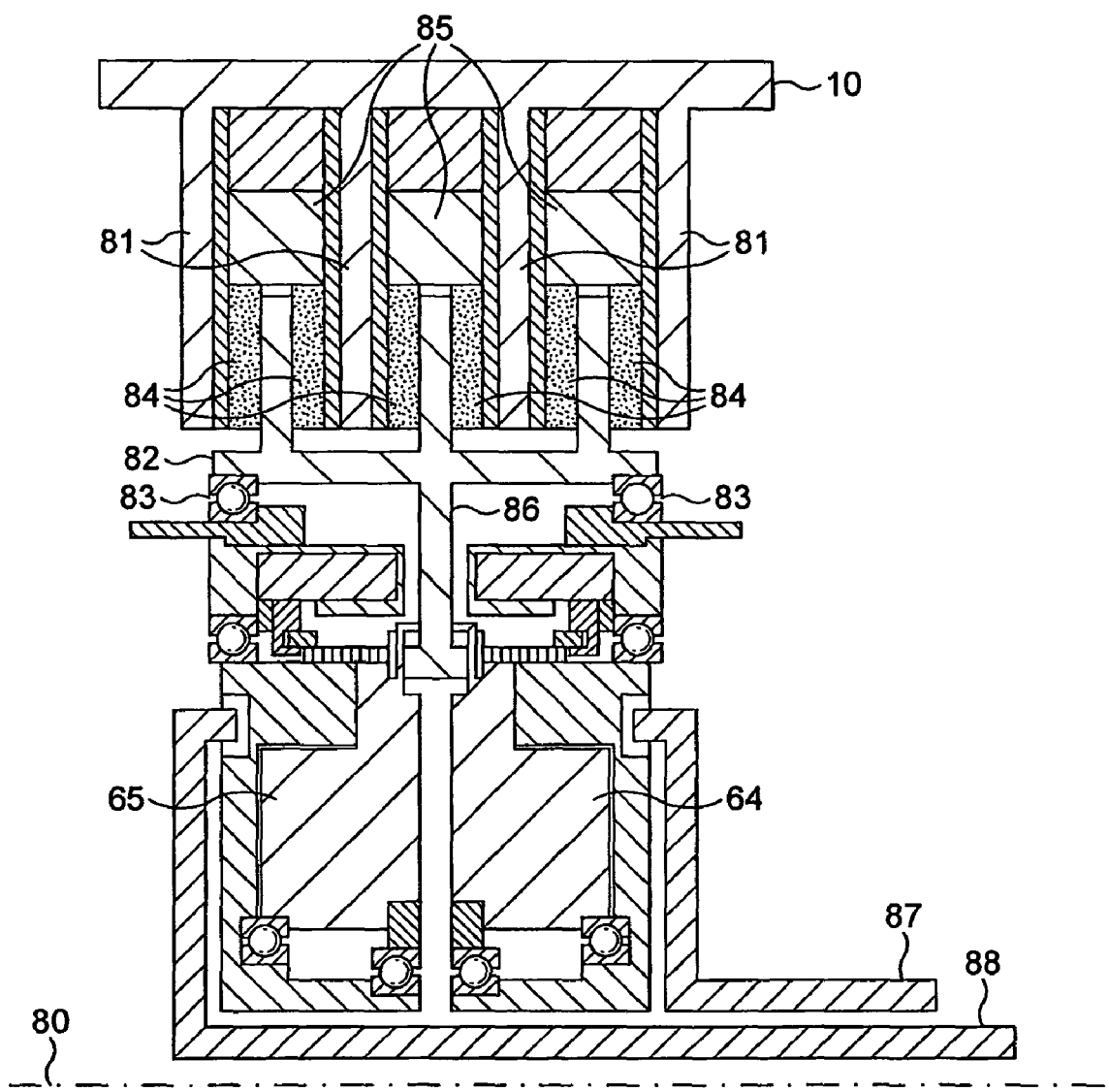
FIG. 9 illustrates schematically a magneto-rheological brake pack.

FIG. 9 illustrates in diagrammatic half-section form a suitable brake for the transmissions illustrated in FIGS. 2-8. The centreline is represented by chain-dot line 80, and in practice is the centreline of the output shaft 16.

A transmission casing 10 has four inwardly directed ribs 81 within which rotate three discs rotatable as an assembly 82 on a ball bearings 83. The space between the discs and ribs contains a magneto-rheological fluid, and surrounding the outer periphery of the discs is an electromagnetic coil 85. In use, energization of the coil 85 causes the fluid 84 to stiffen, thus causing the ribs 81 to act as a brake on the disc assembly.

The disc assembly 82 has an inwardly directed annulus 86 which can be connected via one of two digital clutches 64, 65 to control elements of the transmission gear module. For example the input 87 to clutch 64 is from the third annulus 51 and the input 88 to clutch 65 is from the planet carrier 33, as illustrated in FIG. 8.

The digital clutches each comprise a wrap spring clutch engageable on demand by a suitable electromagnetic coil to connect one or other of the input 87, 88 to the annulus 86. An advantage of the clutches 64, 65 is that when not engaged the disc assembly 82 is relatively stationary with respect to the casing 10, and accordingly parasitic drag is minimized, and moreover unnecessary shearing of the magneto-rheological fluid is avoided.

Figure 10:
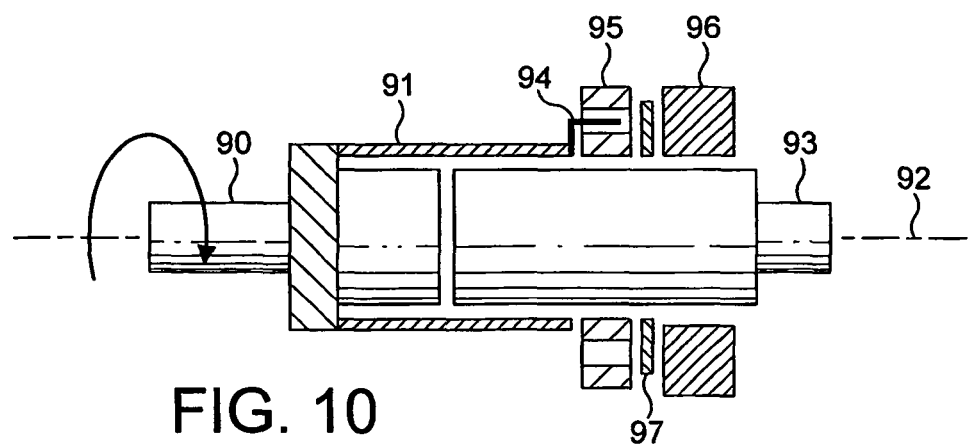
FIGS. 10 and 11 illustrate diagrammatically the operation of a wrap spring clutch.
Figure 11:
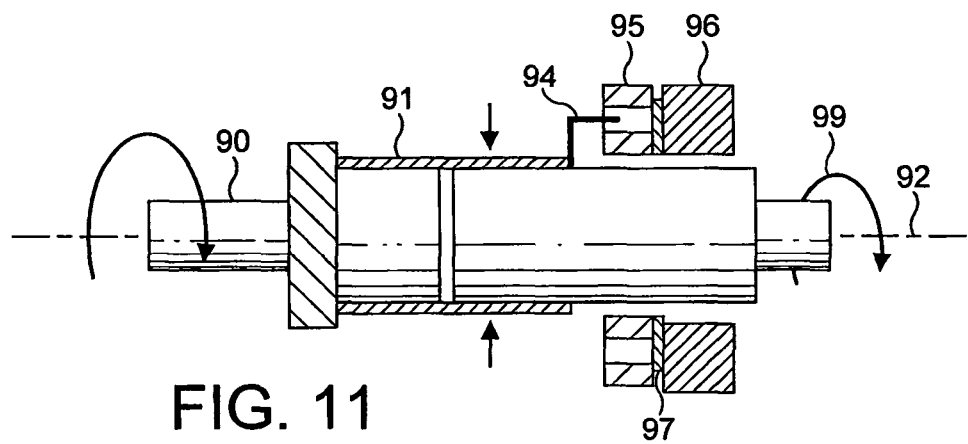

Operation of a wrap spring clutch is shown schematically in FIGS. 10 and 11.

In the open state (FIG. 10) a drive shaft 90 has a coil spring 91 protruding therefrom about the axis of rotation 92. A driven shaft 93 is rotatable about the axis 92 and protrudes within the spring 91 but radially spaced therefrom.

The spring has an axially directed tang 94 at the free end which is engaged in an aperture of a collar 95 rotatable about the driven shaft 93, and axially movable with respect thereto.

On the distal side of the tang is a relatively static electromagnet 96, and between the collar 95 and electromagnet 96 is an optional low friction ring 97, of e.g. PTFE.

As illustrated in FIG. 10, the drive shaft 90 can rotate freely with respect to the driven shaft 93, as indicated by arrow 98, and no torque is transmitted.

FIG. 11 shows a closed state in which the electromagnet is energized to attract the collar 95. As a result the spring 91 tightens about the driven shaft 93, and drive is transmitted, as indicated by arrow 99.

The clearances illustrated in FIGS. 10 and 11 are enlarged in order to demonstrate clearly the principles of operation, in practice the coil spring will have a small radial clearance, and be adapted to engage the driven shaft almost instantaneously.

The arrangement of FIG. 9 shows two digital clutches at the same radius, and side by side. Alternatively, and as schematically illustrated in FIGS. 2-7 the clutches can be at different radii, and typically nested one within the other. The number of discs within the brake of FIG. 9 are of course selected to suit the desired duty, as is the volume of magneto-rheological fluid, the necessary clearances, and the maximum field strength of the coil. All of these variables can be determined empirically by suitable calculation and/or tests.

Figure 12:
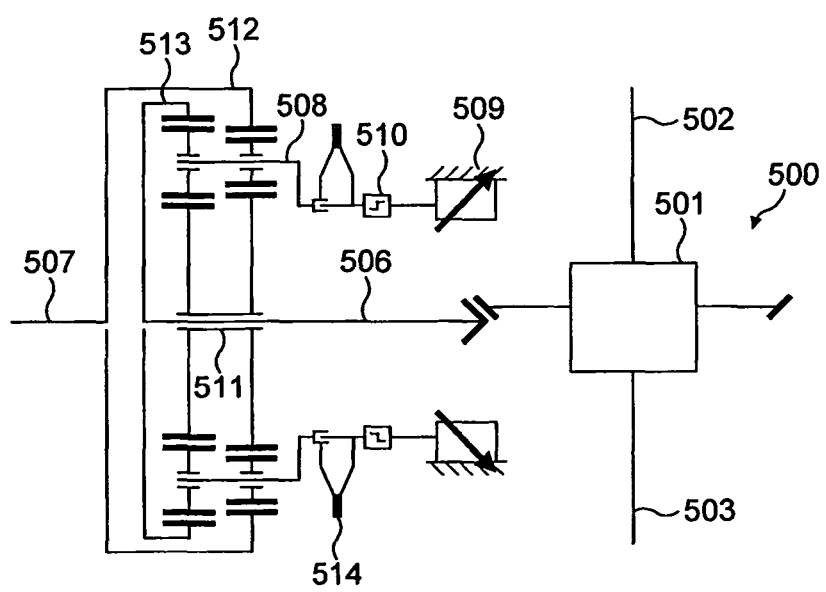
FIG. 12 illustrates schematically an on-demand drive arrangement for an axle.

FIG. 12 shows another embodiment of the invention, which is suitable for a vehicle in which one pair of wheels is permanently driven, and the other pair of wheels is driven on demand.

A front wheel drive vehicle has a rear axle 500 comprising a differential 501, opposed half shafts 502, 503, and a crown wheel/pinion 504 on the input side.

A two train epicyclic transmission 505 has an output 506 connected to the rear axle 500, an input 507 from the front axle/engine, and a common carrier 508 connectable on demand to a brake, 509. The brake 509 is typically of the magneto-rheological kind illustrated in FIG. 9, and accordingly a digital clutch 510 is provided on the input side in order to minimize drag when the brake is not required.

The transmission comprises a common sun 511, planets freely rotatable about the common carrier 508, and annuluses 512; 513 connected respectively to the input 507 and output 506. The output 506 passes co-axially through the transmission, as illustrated.

In use, with the brake 509 disengaged, the transmission cannot transmit torque, and accordingly the rear wheels are not driven. Thus the half shafts and elements of the transmission free-wheel, and the vehicle is driven by the front wheels only.

However, on engagement of the brake 509, the carrier is slowed down or halted, with the consequent effect of speeding-up the rear axle. Thus overspeeding can be employed to give the vehicle rear-wheel drive characteristics on demand, and thus promote oversteer when required. By modulating the brake, the output torque can be varied according to demand (as with other embodiments described herein).

Also included on the input side of the brake 509, and upstream of the digital clutch 510 is a torque limiting clutch 514 which avoids sudden shock to the transmission in the event that the digital clutch has a very sudden engagement characteristic. The torque limiting clutch may for example include a belleville washer to limit the instant load capacity thereof.

This embodiment is suitable for on-demand drive to a front or rear vehicle axle, or to obtain on-demand four wheel drive from a normally two wheel drive vehicle, or simply to provide an on-demand power take-off.

Figure 13:
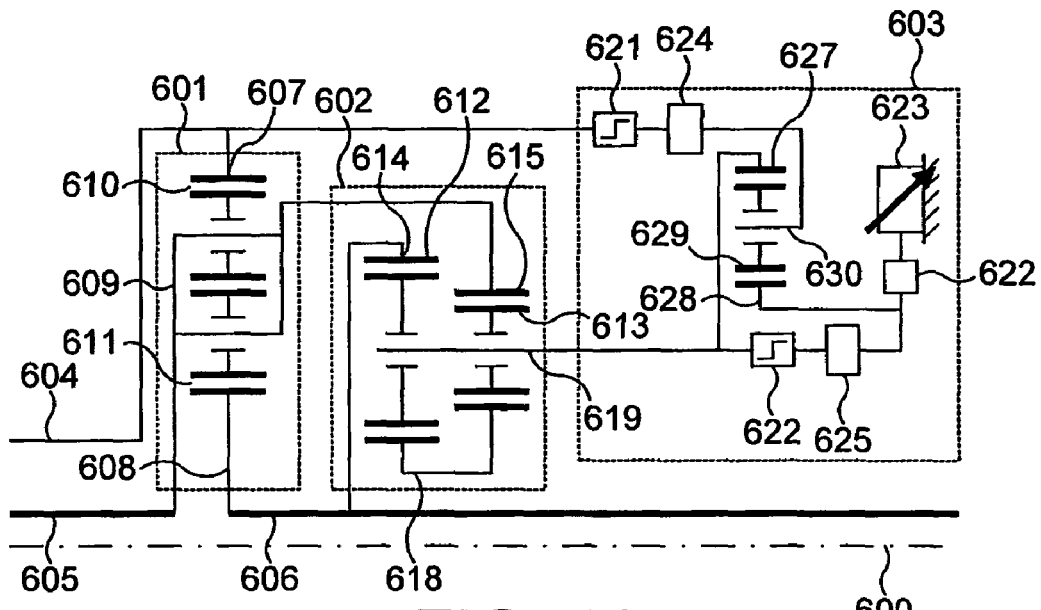
FIGS. 13 and 14 show in diagranumatic half-section further embodiments having a two-train gear module.

FIG. 13 illustrates another embodiment of the invention shown as a half-section about a centreline 600.

This embodiment comprises a differential module 601, a gear module 602 and an actuation (control) module 603. An input 604 is provided from a torque provider (such as an i.e. engine) and the transmission has oppositely directed output shafts 605, 606.

The differential module 601 comprises an epicyclic gear train having annulus 607, sun 608, planet carrier 609 and double planets 610, 611.

The gear module 602 comprises two epicyclic gears side by side with common sun 618 and planet carrier 619, and respective planets 612, 613 and annuluses 614, 615.

The actuation module includes two digital clutches 621, 622 and a brake 623, of the kind previously described. The digital clutches 621, 622 each have in series a torque limiting clutch 624, 625 of the kind described in relation to FIG. 12, and a torque and speed sensor 626 is provided on the input side of the brake 623.

An epicyclic gear is also provided between the torque paths associated with each digital clutch, and comprises the usual annulus 627, sun 628, planets 629 and planet carrier 630.

In use the output shafts may direct torque to front and rear axles, and the device allows a variation in the torque ratio. Thus, for example the front/rear torque split may be 40:60 for good acceleration performance, or may be split 60:40 for stable cornering performance.

Connectivity of the transmission of FIG. 13 is as follows. The input 604 drives the differential annulus 607 and provides a torque input to one of the digital clutches 621. The first output 605 is connected via the differential planet carrier 609 to one annulus 615 of the gear module. The other annulus 614 is connected to output shaft 606, which is also connected to differential sun 608. The planet carrier 619 of the gear module provides an input to the second digital clutch 622, and is also coupled to the annulus 627. Finally, the output of the digital clutch 621 is connected to the brake 623 via planet carrier 630, planets 629 and sun 628.

In operation drive torque from the input 604 will be distributed directly to the output shafts 605, 606 by the differential module 601 in proportion to the resistance to rotation of those shafts, which in a vehicle is determined by the road surface resistance.

If digital clutch 622 is engaged, and resistance exerted by the brake 623, the carrier 619 will be slowed relative to the output shaft 606, and as a result will rotate around the common suns 618. The unequal ratios of the epicyclic gears in the gear module 602 will result in a speed bias, which will act on the differential carrier 609 by virtue of the connection from annulus 615. This will in consequence bias the differential gear to distribute torque from output shaft 606 to output shaft 605.

In the event that digital clutch 622 is released, and digital clutch 621 is engaged, the brake 623 can provide a drag via the epicyclic gear of the actuation module 603 which has the effect of increasing the speed of carrier 619, and in consequence distributing torque from output shaft 605 to shaft 606.

The brake 623 is of course under the control of an external computer, and can be locked or modulated on demand in order to give the appropriate speed change to the carrier 619, and progressive distributing torque from one output shaft to the other.

A park lock can be obtained by closing both digital clutches 621, 622, and locking the brake 623.

The following table gives a non-exhaustive list of conditions which are available with the transmission of FIG. 13.

| Condition | Clutch 621 | Clutch 622 | Brake 623 | Modulation |
|---|---|---|---|---|
| Unbiased differential gear 601, no torque vectoring | Open | Open | Off | None |
| Locked differential gear 601 | Closed | Closed | Off | None |
| Park or hill start or creep mode | Closed | Closed | On | Brake 623 locked to provide park action on/off modulation to provide creep or hill start option |
| Torque preferentially vectored to output 605 | Open | Closed | On | Increased torque from brake 623 |
| Torque preferentially vectored to output 606 | Closed | Open | On | Increased torque from brake 623 |

Figure 14:
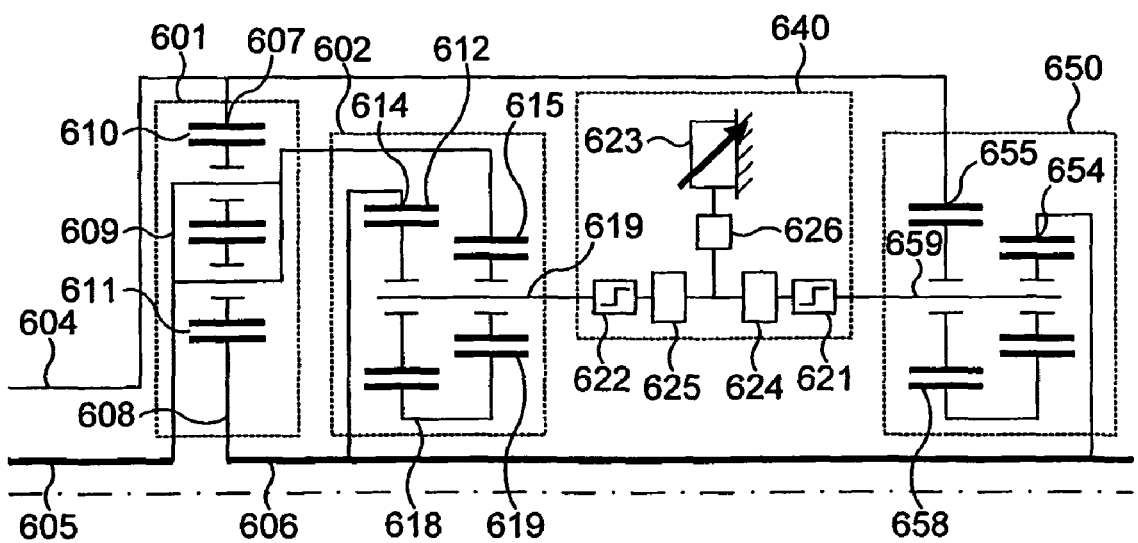

FIG. 14 shows an alternative transmission arrangement corresponding to FIG. 13, and in which common parts carry the same reference numerals. Thus the differential module 601 and gear module 602 are identical to the embodiment of FIG. 13, and have the same connectivity.

An actuation module 640 comprises the digital clutches 621, 622, torque limiting clutches 624, 625 and brake 623.

A second gear module 650 mirrors gear module 602. Thus in the case of modules 602, an input to one annulus 654 is from the output shaft 606. The input to the other annulus 655 of the second module is from the input shaft 604. The suns 658 of the second annulus are fixed for rotation together, and the carrier 659 provides an input to digital clutch 621.

As before engagement of one or other digital clutch alters the torque bias to the output shafts 605, 606 according to the braking torque available from modulation of brake 623.

The skilled person will appreciate that the arrangement of FIG. 14 is somewhat disadvantageous because power supply to the actuation module 640 must cross the drive input to the second gear module 650; thus for an electrical power supply, suitable slip rings or the like are necessary. The torque sensor 626 may be used to provide an input to the control computer (ECU).

FIGS. 15-21 illustrate schematically in half section various embodiments of the invention. Common parts are indicated by the same reference numeral.

Figure 15:
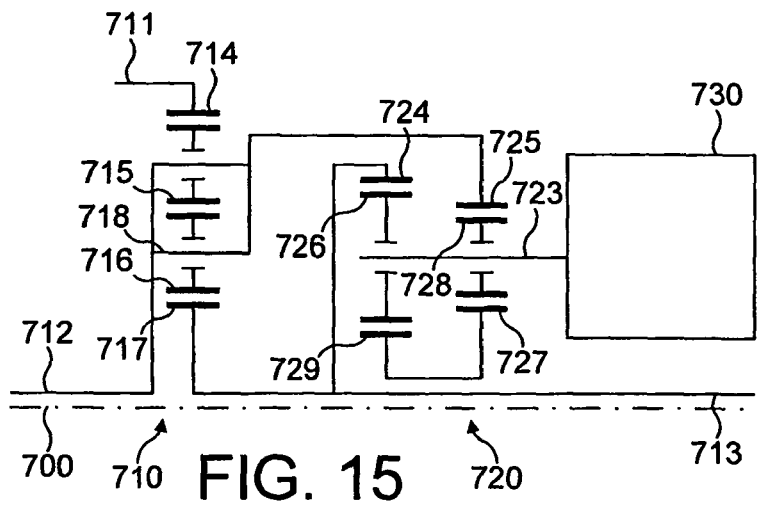
FIGS. 15-18 show in diagrammatic half-section some generic embodiments having a two-train gear module.

FIG. 15 shows a transmission having a rotational axis 700, a differential gear module 710, a torque biasing gear module 720 and an actuation (control) module 730.

The differential gear module 710 comprises an input 711, and two outputs 712, 713. The module 710 comprises annulus 714, double planets 715, 716, sun 717 and planet carrier 718. As illustrated, the input 711 drives the annulus, whereas outputs 712, 713 are driven by the sun 717 and planet carrier 718.

The torque distributing gear module 720 comprises two epicyclic gear trains side by side and having suns 727, 729 linked for rotation in common, and a common planet carrier 723. Also illustrated are planets 726, 728 annuluses 724, 725 connected one each to the differential planet carrier 718, and to the output shaft 713. The control module 730 acts on the planet carrier 723 to cause slowing down or speeding up, thereby to alter the torque bias from the differential gear 710, as previously explained.

Figure 16:
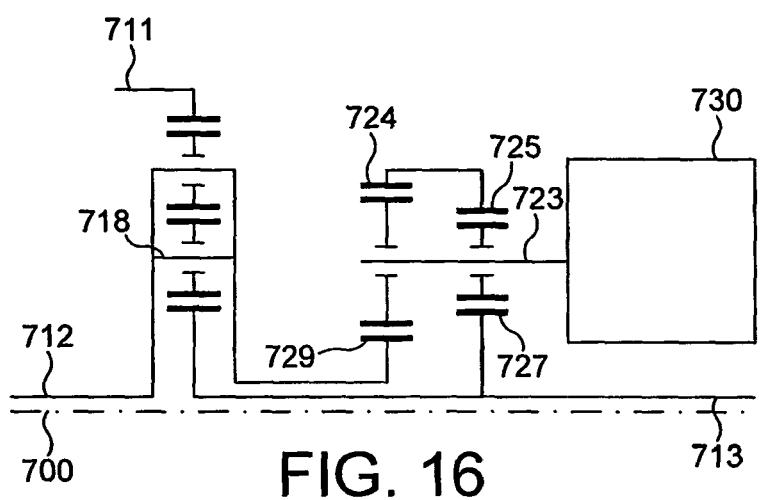

The embodiment of FIG. 16 is similar to FIG. 15, but the annuluses 724, 725 are linked for rotation together. Connectivity is thus different, so that the sun gears 729, 727 of the torque biasing gear module are connected one each to the differential planet carrier 718, and to the output shaft 713. Once again the actuation module 730 is operable to vary the speed of the planet carrier 723.

Figure 17:
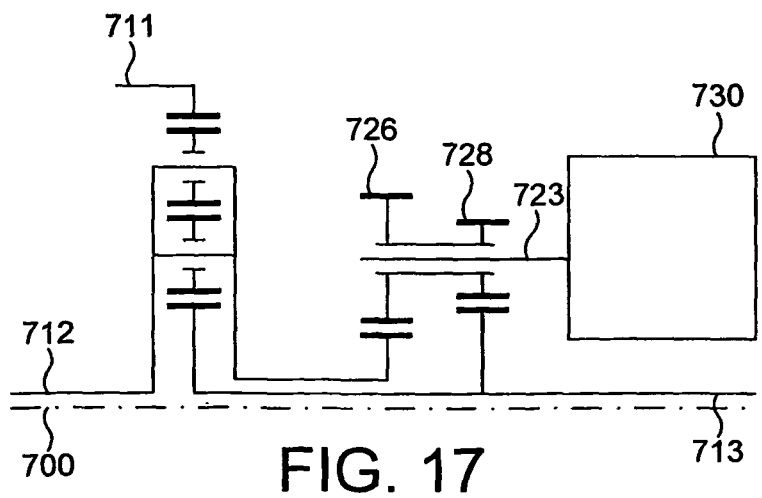

In FIG. 17, the planets 726, 728 of the biasing module 720 are joined, and no annuluses 724, 725 are provided. Connectivity is the same as in FIG. 16.

Figure 18:
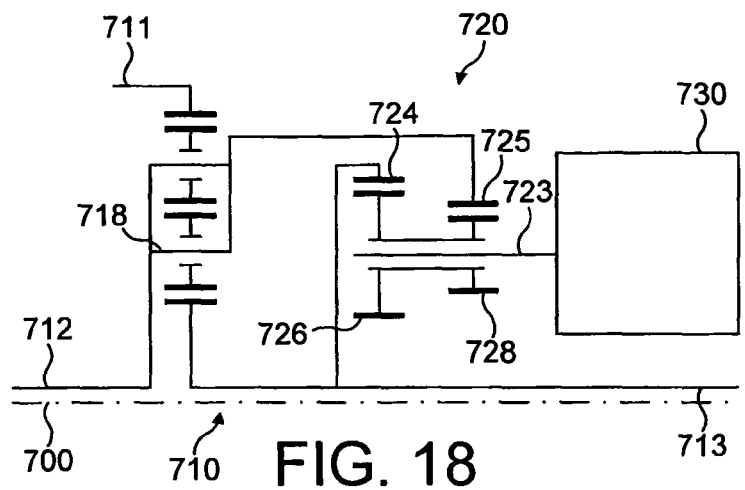

In FIG. 18, the planets 726, 728 are joined and no suns 727, 729 are provided. Connectivity is the same as in FIG. 15.

The embodiment of FIGS. 15-18 show different gear arrangements which may be individually suitable, depending on the installation envelope which is available, and the anticipated speeds and torques of the intended application.

Figure 19:
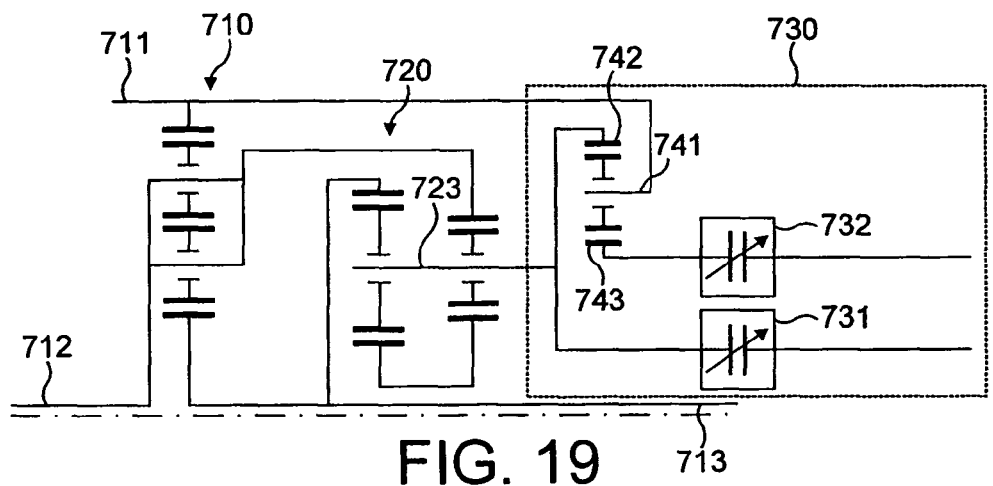
FIGS. 19-21 show in diagrammatic half-section some alternative control modules.
Figure 20:
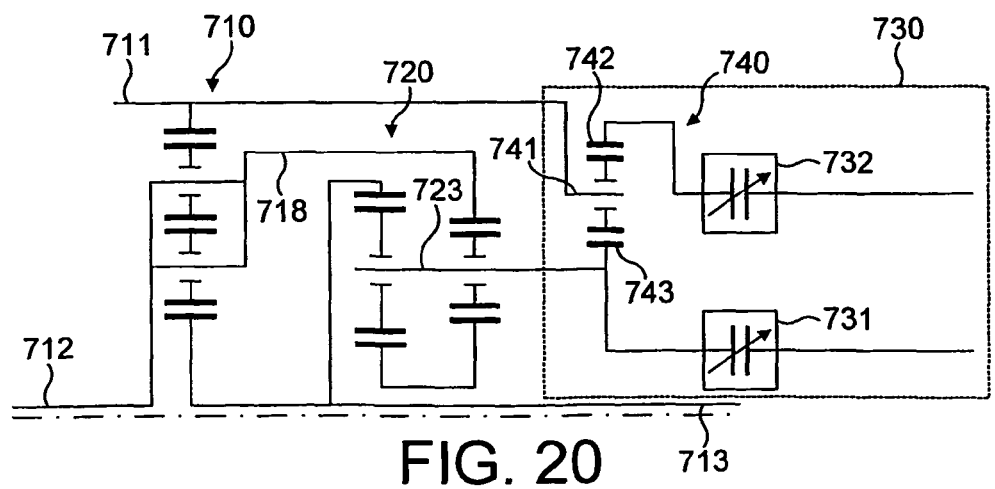
Figure 21:
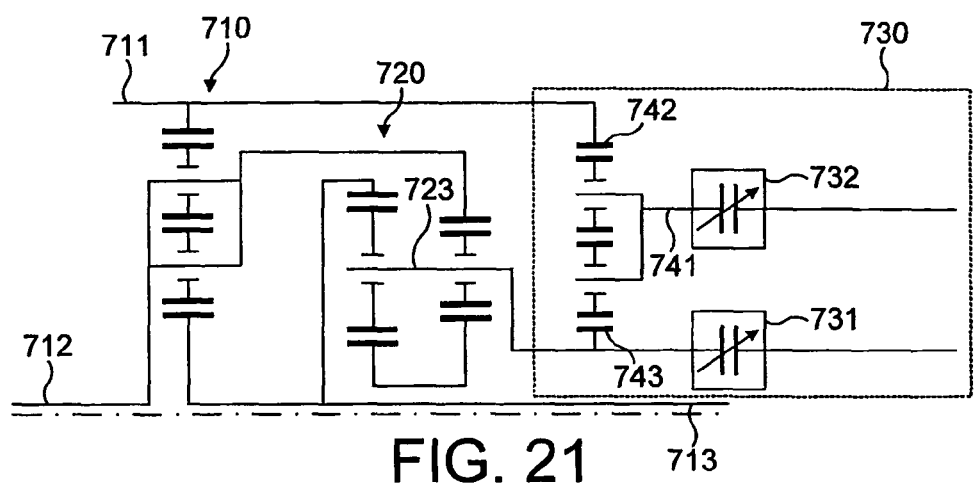

The embodiments of FIGS. 19-21 show various embodiments of the actuation module 730 applied to a biasing module 720 with common suns (as shown in FIG. 15). It will be readily understood that these differing actuation modules may also be applied to the common annulus (FIG. 16) and common planet (FIGS. 17 & 18) variants.

FIG. 19 corresponds to FIG. 15 and illustrates by way of example, a suitable actuation module 730. The planet carrier 723 is connectable to ground (typically the transmission casing) via one of two brakes 731, 732 which are operable alternately. One brake 731 acts directly on the planet carrier 723, whereas the other acts via an epicyclic actuation train 740. Thus train 740 comprises a planet carrier 741 connected to the input 711, an annulus 742 connected to the planet carrier 723, and a sun 743 connected to the second brake 732. The effect of train 740 is to speed up the planet carrier 723 on application of the brake 732.

FIG. 20 shows how the modules 710, 720 of FIG. 18 can be connected differently to the brakes 731, 732. In particular the brake 732 is connected to the annulus 742, whereas the carrier 741 is connected to the input 711. Again, the train 740 has the effect of speeding up the carrier 723 on application of the brake 732.

FIG. 21 shows how the modules 710, 720 may be connected to the brake 732 via a double planet epicyclic gear. In this case the annulus 742 is connected to the input 711, and the planet carrier 741 is connected to the brake 732.

The arrangement of FIG. 21 gives greater symmetry of operation at the expense of additional planet gears in train 740, and a more complex planet carrier 741. By using double planets, the brake 732 can act on the carrier 723 with substantially the same speed ratio as the brake 731.

FIGS. 22-27 illustrates an embodiment corresponding to the schematic representation of FIG. 20. Corresponding parts carry the same reference numerals.

Figure 22:
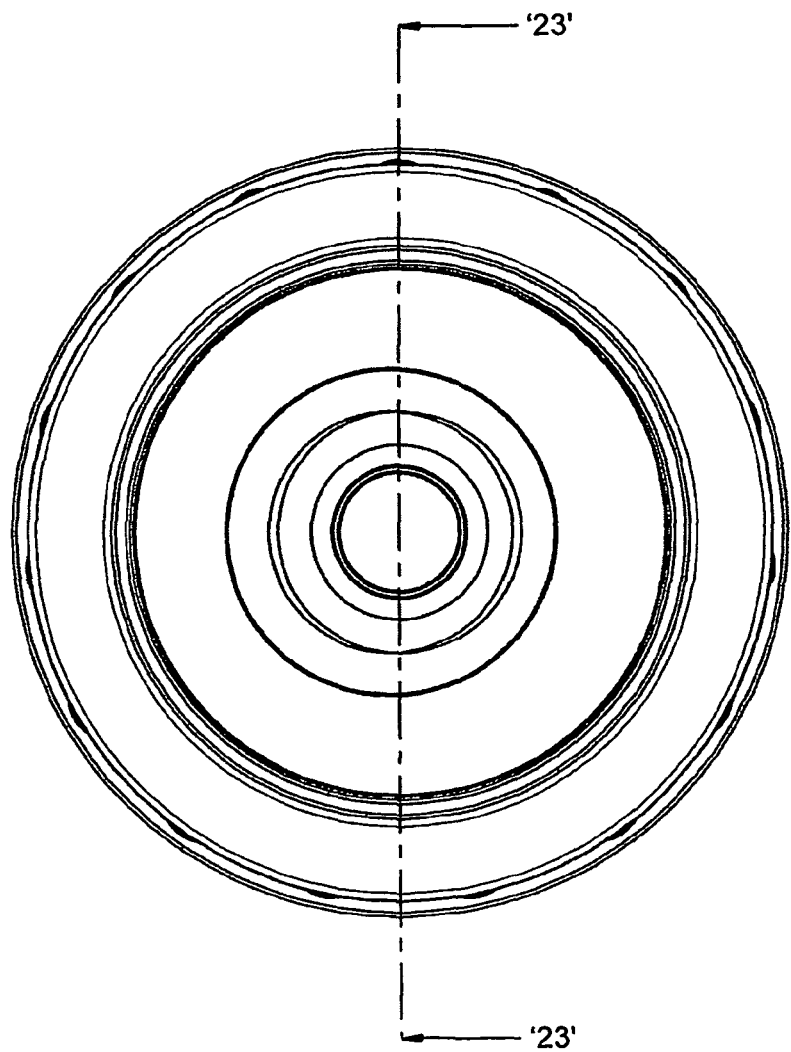
FIGS. 22-27 show in end elevation, axial section and transverse section, a transmission embodying the principles of the schematic layout of FIG. 20.
Figure 23:
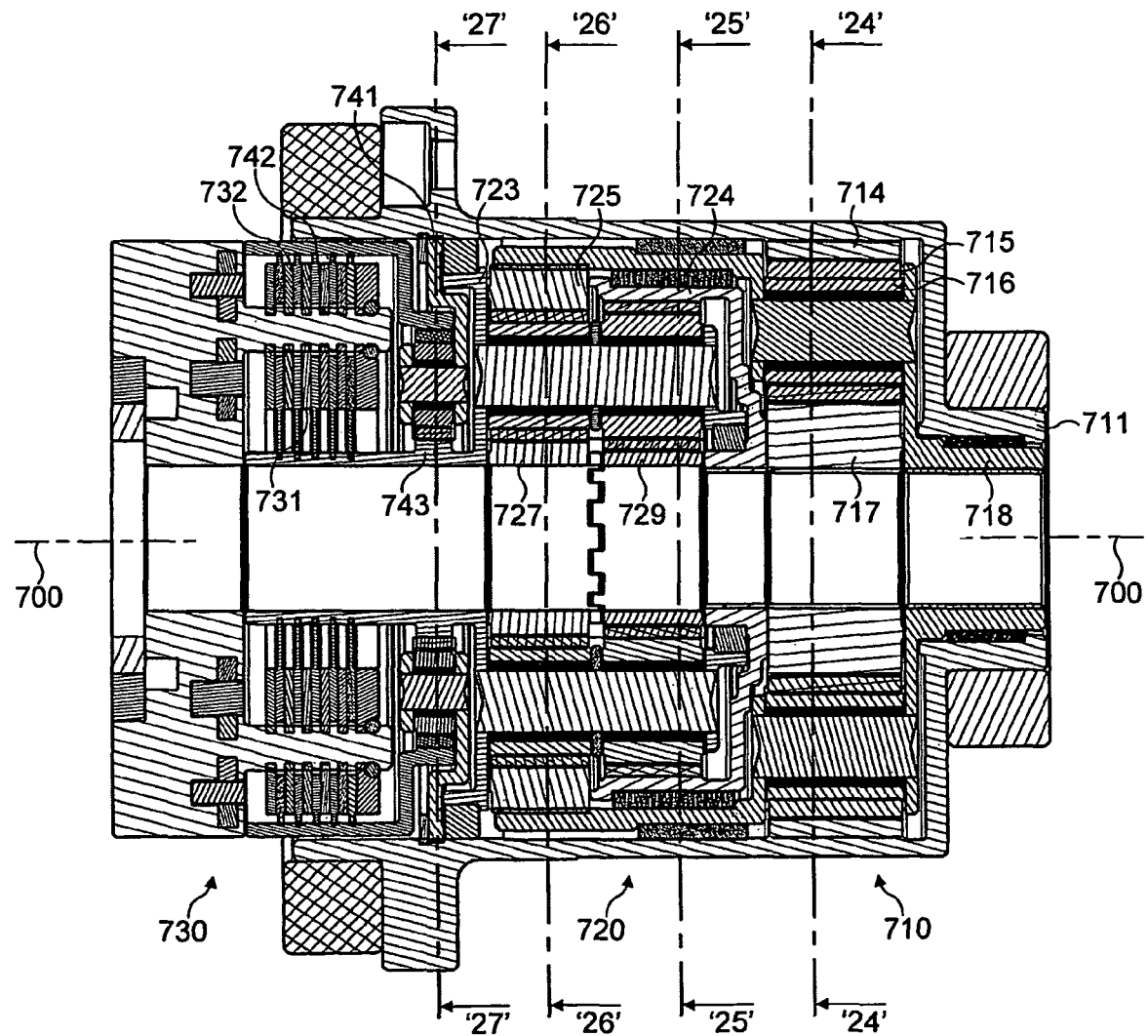

The end elevation of FIG. 22 illustrates the generally cylindrical nature of the transmission, and the axial section of FIG. 23 illustrates how the components may be conveniently packaged into a compact unit with co-axial brakes 731, 732 nested one within the other about a rotational axis 700.

FIG. 23 indicates generally how the axes of rotation of the elements of the transmission are arranged to give a compact device. The planets 727, 729 of the gear module are linked by representative castellations. The axes of the planet carriers of the differential module 710, gear module 720 and actuation modules 730 are at successively reducing radii. The annulus 724 adjacent the differential module 710 has a greater radius than the annulus 725 which is adjacent the actuation module 730, and as a consequence an annular spacing element is provided.

The brakes 731, 732 are nested radially and have a common intermediate grounding element, as illustrated. All components of the device are contained within a substantially cylindrical casing, and the individual modules 710, 720, 730, 740 can be assembled and tested individually prior to assembly.

Figure 24:
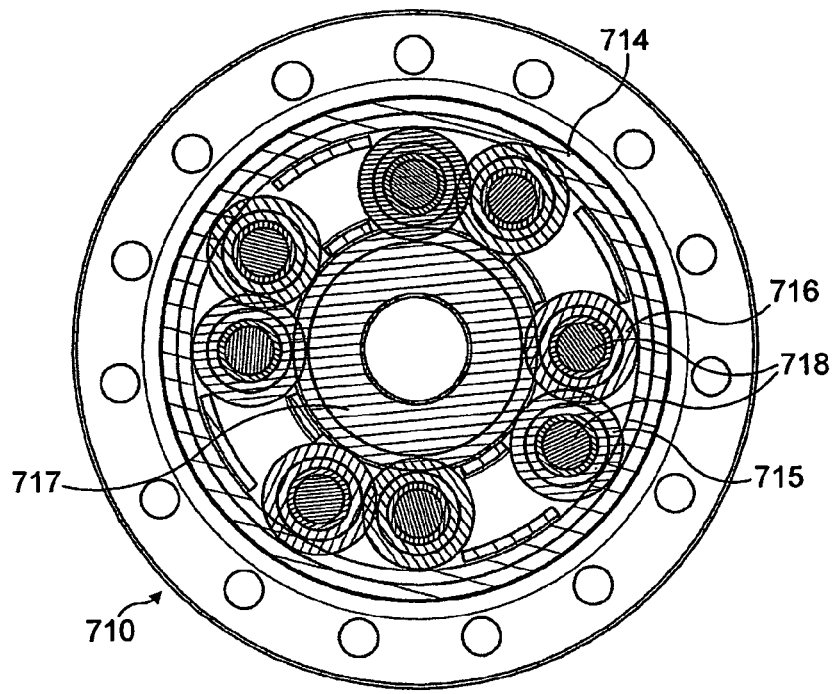

FIG. 24 is a transverse section through the differential module 710 and shows the double planets 715, 716 between annulus 714 and sun 717. The output shaft 712 makes a splined connection with the sun 717, and the input shaft 711 is connected to the annulus 714. The double planet carrier 718 is connected to the annulus 725 of the gear module 720 which is adjacent the control'module 730.

Figure 25:
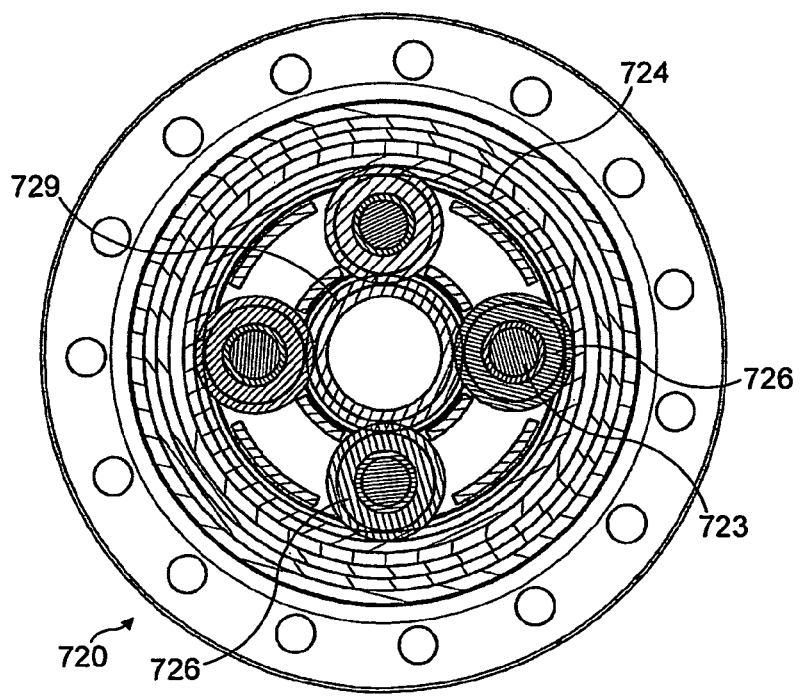

FIG. 25 is a. transverse section through the first epicyclic gear of the gear module 720, and shows annulus 724, sun 729, and planets 726. Planet carrier 723 is common with the second epicyclic gear.

Figure 26:
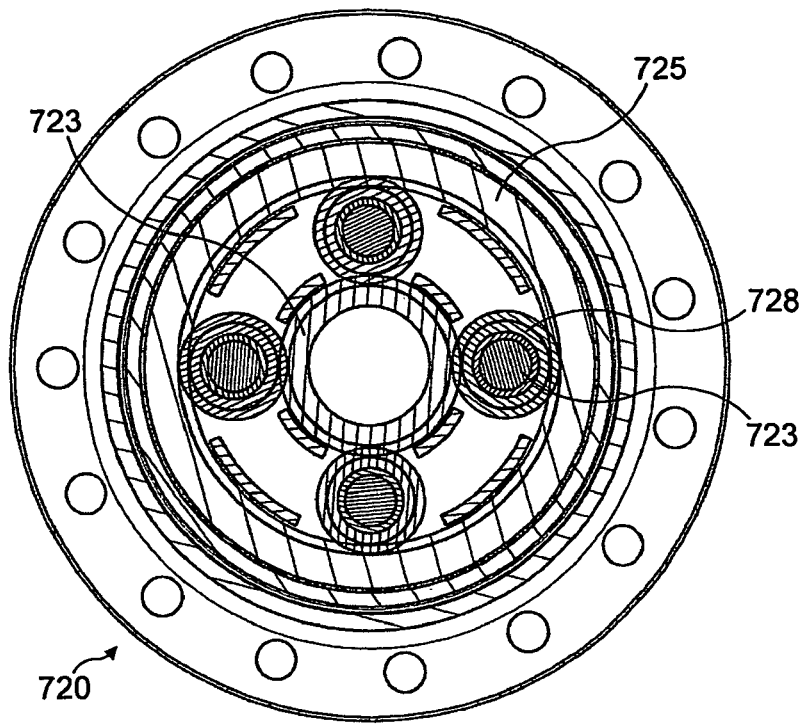

FIG. 26 corresponds to FIG. 25 and shows the second epicyclic gear of the gear module, which comprises annulus 725, sun 727, planets 728 and common carrier 723.

Figure 27:
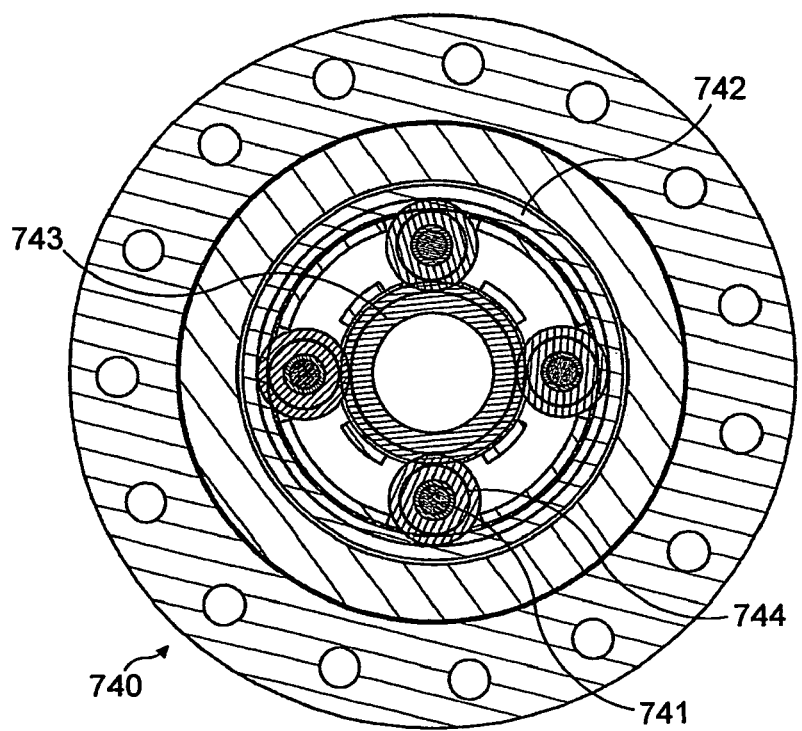

FIG. 27 is a transverse section through the epicyclic train 740 of the control module 730, and comprises annulus 742, sun 743, planets 744 and planet carrier 741.

Connectivity is as illustrated in the schematic diagram of FIG. 20.

Figure 28:
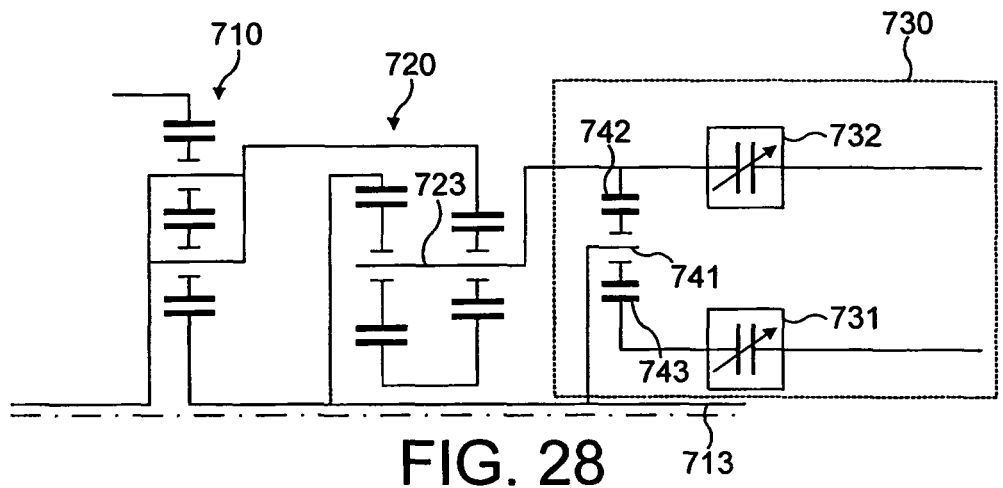
FIGS. 28-30 show in diagrammatic half-section some control modules with an input from the drive side of the transmission.

In FIG. 28, yet another alternative embodiment provides an input to the actuation module from one of the output shafts 713, rather than from the input 711. Thus the epicyclic gear of the actuation module has an annulus 742 connected to the planet carrier 723, and a planet carrier 741 connected to the output shaft 713. Brake 731 is coupled to the sun 743, and brake 732 acts on the annulus 742.

Figure 29:
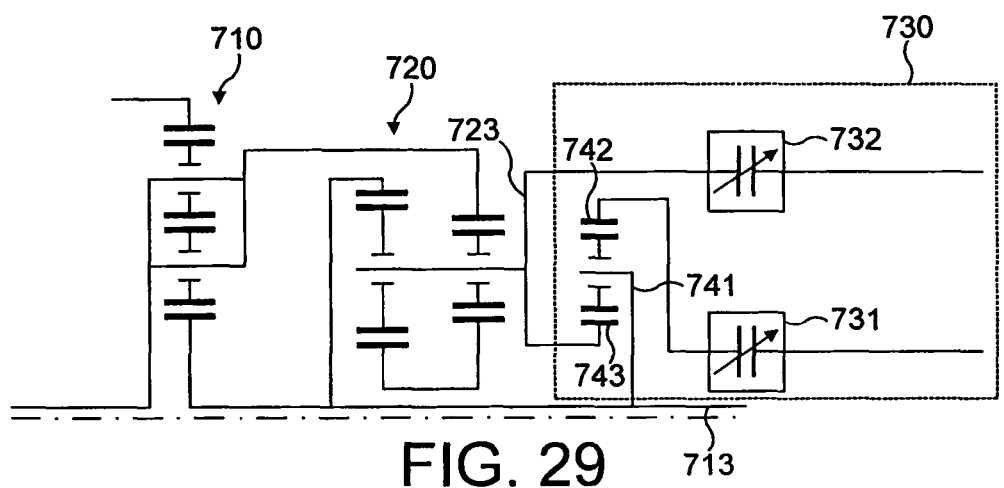

FIG. 29 shows alternative connectivity for the arrangement of FIG. 28, in which brake 732 is connected to the planet carrier 723. Brake 731 acts through a differential gear in which the annulus 742 is connected to brake 731, the planet carrier 741 is driven by the output shaft 713, and the sun 743 is also connected to the planet carrier 723.

Figure 30:
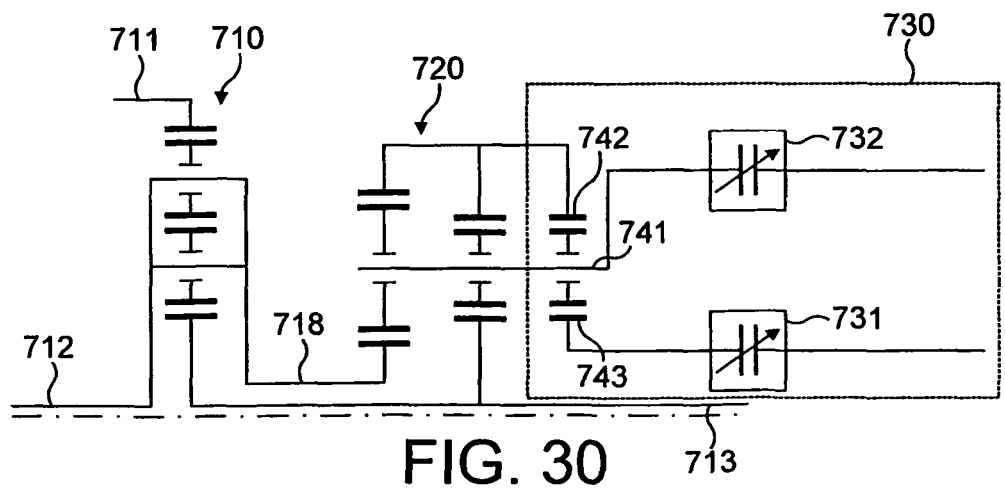

FIG. 30 shows yet another alternative connectivity for the embodiment of FIG. 28. In this case the differential planet carrier 718 drives a first sun of the gear module 720. A second sun is connected to an output 713. The annuluses of the gear module 720 are connected and drive the annulus 742 of the epicyclic train within the control module 730. The planet carrier 741 of the control module is connected to the planet carrier of the gear module 720, and to the brake 732. The sun 743 of the control module is connected to the other brake 731, as illustrated.

The embodiments of FIGS. 28-30 illustrate alternatives that may be used depending on the packaging envelope available in the circumstances of intended use.

FIGS. 31-34 illustrates in schematic half-section undriven embodiments which are adapted for varying torque between two output shafts 801, 802. The shafts 801, 802 are connected through a torque vectoring gear module 810, and under the control of an actuation module 820. The shafts have a common axis of rotation 800.

The gear module 810 comprises two epicyclic gear trains having joined annuluses 811, 812, and suns 813, 814 connected one to each output shaft 801, 802. A common planet carrier 815 can be influenced by one of two brakes 827, 828 via an epicyclic train 821 of the actuation module 820.

As illustrated the annulus 822 of the train 821 is connected to the common annuluses 811, 812, and the sun 823 is connected to one of the brakes 827. The other brake 828 is connected to the planet carrier 824, which is in turn connected to the common planet carrier 815.

In operation torque can be generated in each output shaft by virtue of friction at the output end, for example, in a road vehicle between the respective tyres and the road. By applying one or other brake 827, 828 the torque ratio between the shafts can be biased. Thus application of brake 827 will speed up the carrier 815 and transfer torque from one output shaft to the other output shaft. Application of brake 828 will retard the carrier 815, and have the opposite transfer effect.

Figure 31:
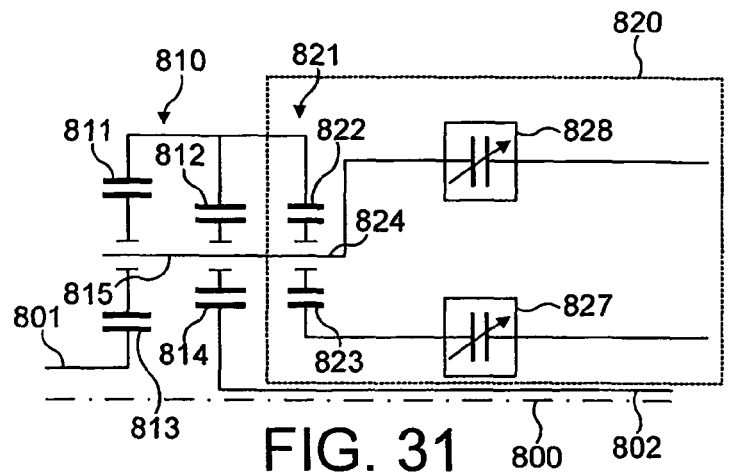
FIGS. 31-34 show in diagrammatic half-section some control modules for undriven embodiments.
Figure 32:
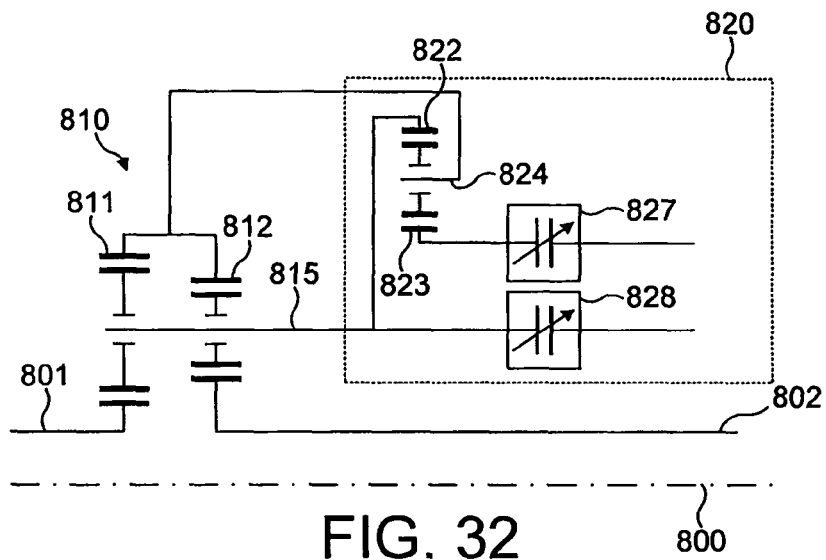

FIG. 32 corresponds to FIG. 31 and shows an alternative arrangement of the differential gear of the actuation module 820. The same parts carry the same reference numerals. Connectivity is altered so that the common annulus 811, 812 drives the planet carrier 824, and the common planet carrier 815 drives the annulus 822. Operation is as described in relation to FIG. 31, the brake 828 acting to retard the planet carrier 815, and the brake 827 acting to speed it up.

Figure 33:
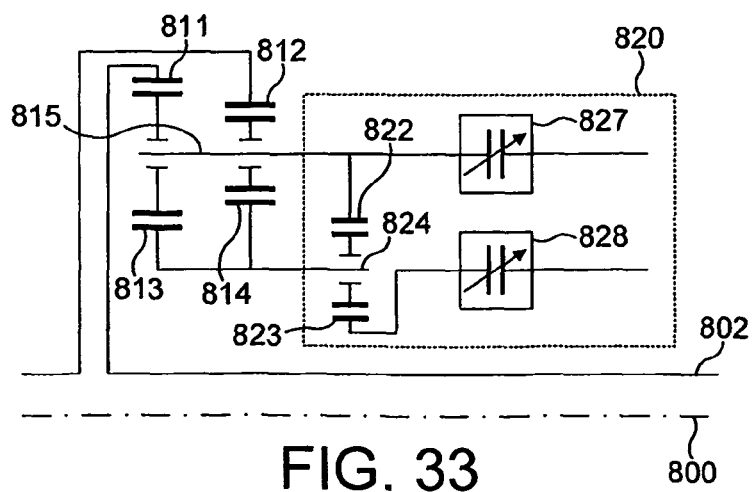

A third embodiment illustrated in FIG. 33 has joined planets 817, 818 in the gear module 810, the respective output shafts 801, 802 being connected to annuluses 811, 812, and the suns 813, 814 being connected for rotation in common. Inputs to the actuation module 820 are thus from the planet carrier 815 and common suns 813, 814.

In the actuation module, the epicyclic gear has an annulus 822 driven from the planet carrier 815, and a planet carrier 824 driven from the common suns 813, 814. The brakes 828, 827 are respectively connected to planet carrier 815 and to the sun 823. Operation is as previously described with brake 828 having a retarding function, whereas brake 827 has a speeding-up function.

Figure 34:
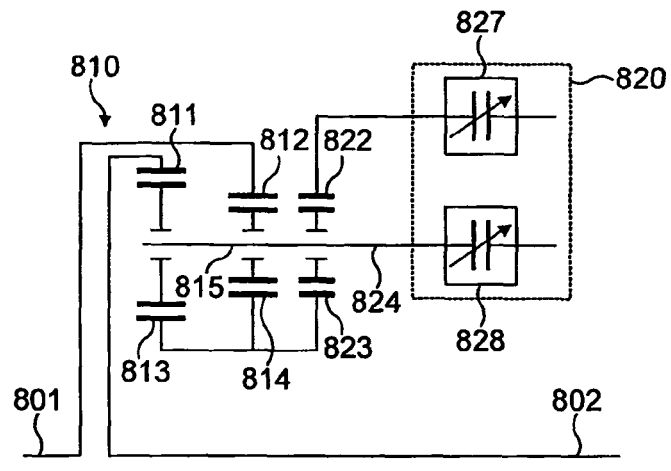

Another embodiment is shown in FIG. 34, and also has the output shafts 801, 802 driving respective annuluses 811, 812. For illustration purposes the epicyclic train of the gear module 810 includes the epicyclic train illustrated as part of the actuation module in the embodiments of FIGS. 23-25, so that the three trains lie in axial series.

In these trains, a common planet carrier 815, 824 is connected to brake 828. Suns 813, 814, 823 are joined for rotation together, and the third annulus is connected to the brake 827. Operation is as previously described.

Figure 35:
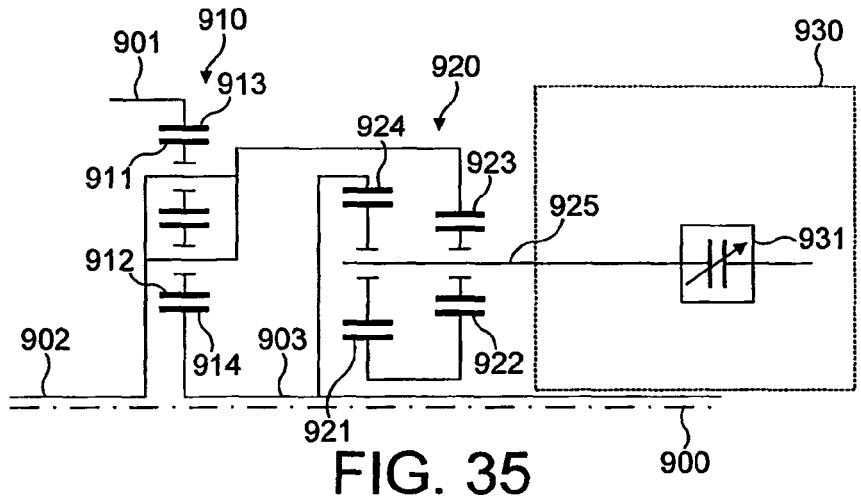
FIGS. 35 and 36 show in diagrammatic half-section some unidirectional biasing arrangements for driven embodiments.

The arrangement of FIG. 35 has an input 901 and two outputs 902, 903, illustrated in half-section about a rotational axis 900.

A differential module 910 has double planets 911, 912, an annulus 913 driven from the input 901, a sun 914 driven from one output 903, and a planet carrier 915 driven from the other output 902.

A torque biasing module 920 has two epicyclic trains in series with common suns 921, 922, one annulus 923 driven from the differential planet carrier 915, and the other annulus 924 driven from the co-axial output shaft 903. A common carrier 925 provides a single input to the actuation module 930, which in this case comprises a single brake 931.

Figure 36:
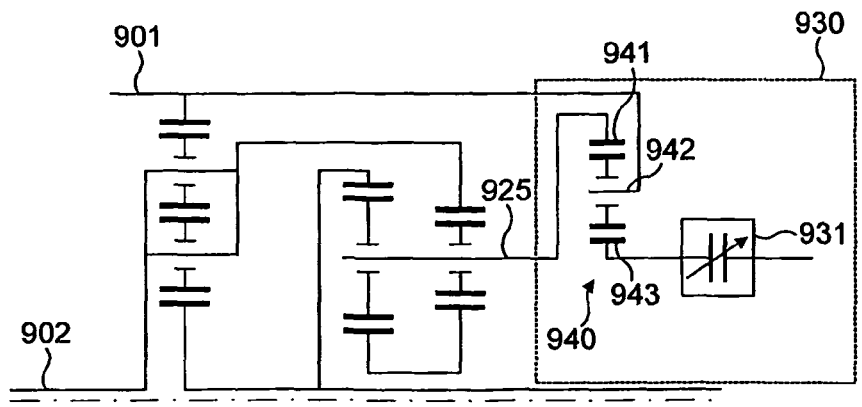

FIG. 35 permits slowing of the planet carrier 925 (though speeding-up is possible using one of the previously mentioned arrangements and that of FIG. 36, which follows) and has application in the centre differential of a four wheel drive vehicle, to deviate from the usual fixed torque bias between front and rear axles. The bias is unidirectional in the illustrated embodiment, because the brake 931 can act only to slow the planet carrier 925.

The embodiment of FIG. 36 also gives a unidirectional bias, similar to that of FIG. 35. However in this case an epicyclic train 940 is provided within the actuation module 930, and acts on the planet carrier 925 via an annulus 941. An input to the planet carrier 942 of train 940 is from the input 901, and the sun 943 is coupled to the brake 931.

Figure 37:
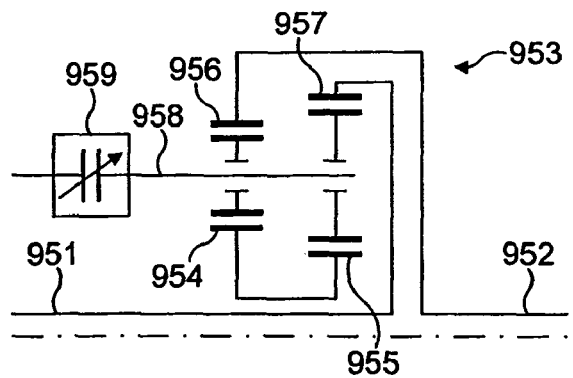
FIG. 37 shows an in line on-demand drive arrangement.

FIG. 37 shows in diagrammatic half-section a disengageable drive, for example from a driven front axle to a normally undriven rear axle or PTO.

An input shaft 950 and output shaft 951 are connectable on demand via a gear module 953 having two epicyclic gear trains in series. The suns 954, 955 are connected for rotation together, and the annuluses 956, 957 are connected on each to a respective input and output 950, 951. The common planet carrier 958 drives to a single brake 959. In use application of the brake 959 causes torque to be applied to the output shaft 952, and may be arranged to overspeed a rear axle so as to import rear drive characteristics to a normally front drive vehicle.

Figure 38:
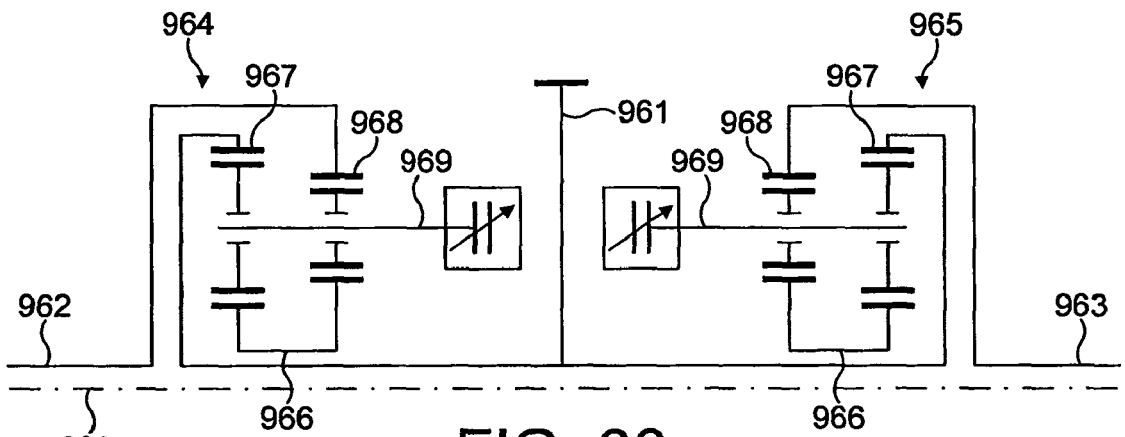
FIG. 38 shows an on-demand embodiment with two outputs.

FIG. 38 illustrates in half-section a transmission which does not include a differential gear, but relies on the operation of brakes for the transmission of drive.

The transmission of FIG. 38 is symmetrical about a rotational axis 960, and comprises an input gear 961, two output shafts 962, 963, and respective mirror image gear modules 964, 965 therebetween. Commonality of gear modules of other previously described embodiments could also be included in an arrangement of this kind.

Each module 964, 965 comprises two epicyclic gear trains side by side, with sun gears 966 joined for rotation in common. The respective annuluses 967, 968 are connected one each to the input gear 961 and a respective output shaft 962, 963. Each module also has a common planet carrier 969 connected to a respective brake 970.

It will be appreciated that this transmission cannot transmit drive unless both brakes 970 are modulated to provide a drag to the respective planet carriers 969. Continuous modulation will however permit some differential action under control of a suitable computer with appropriate sensor inputs.

Figure 39:
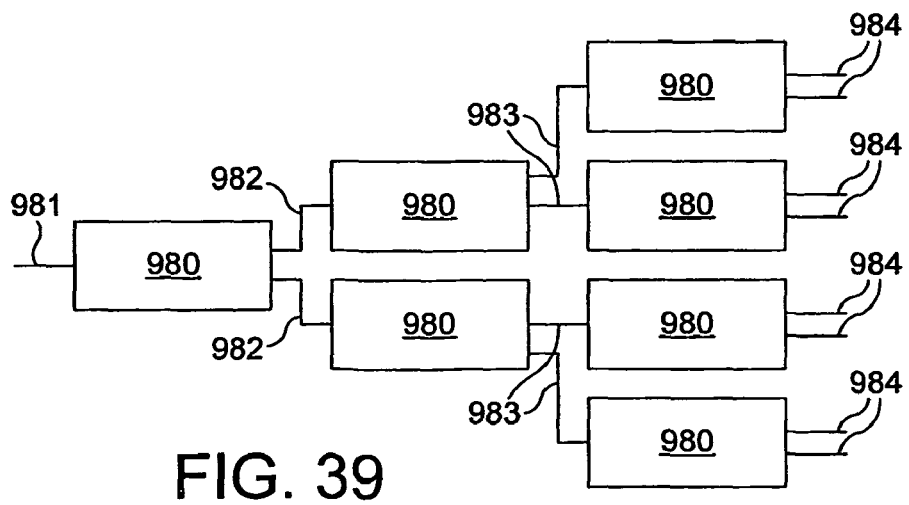
FIG. 39 shows nesting of plural devices to give multiple controllable outputs from a single input.

FIG. 39 illustrates how embodiments of the invention may be combined to give multiple outputs. Thus a plurality of transmission modules 980 are connected so that the outputs of one module provide the inputs to the next module in sequence. Thus three modules can be linked to give four outputs 983 from one input 981, and five modules will give eight outputs 984, and so on. Such a system may be useful in for example ship transmissions, where a number of propellors and thrusters may be required to be driven from a single power source.

In this specification, the digital clutches are optional in embodiments where two, speed adjusting devices are provided in the control or actuation module. The digital clutches are incorporated in these embodiments to provide an absolute interruption to drive, and consequently eliminate energy losses or degradation in the speed adjusting device itself. Thus typically drag and idle wear in a brake will be avoided. The term 'digital clutch' includes any device suitable to make or break drive on demand, but is particularly used in the described embodiments to indicate a clutch having little thermal capacity—such a clutch may thus be physically compact. In each case a digital clutch may include some shock-reducing element to ensure smooth engagement thereof.

In the case of a single speed adjusting device (e.g. FIG. 2) the digital clutches, or equivalent, are essential because in addition to breaking drive, the clutches are part of the respective torque path where torque biasing is commanded.

Certain embodiments of the invention use a brake alone, so as to cause on-demand slowing of an element of a gear module (FIG. 12). Certain other embodiments show one brake having two operative paths (FIG. 2) or two brakes (FIG. 1); these embodiments provide slowing or speeding of a gear module. As previously noted, other means of speeding-up or slowing-down are possible, including for example hydraulic, pneumatic or electric motors. Thus an electric motor may provide a single output from an actuation module to a planet carrier of a gear module (for example the embodiments of FIGS. 15-18), and the motor may run at a neutral speed where torque vectoring is not required. In cases where torque vectoring is required the motor may be speeded-up or sloweddown according to an input signal from the control computer. A digital clutch may of course be provided at the motor output to permit the motor to be disengaged when not required.

The skilled man will also realise that in certain vehicle applications, the locking of multiple brakes may provide a locked transmission, which is useful as a parking brake or hill hold. The locking of multiple brakes may also provide an emergency brake in the event that a conventional braking system has failed.

This specification uses the term 'brake' to indicate any device capable of transmitting a retarding torque between two members; it will be appreciated that many other devices, such as single or multi-plate clutches, can be employed as brakes.

It will also be understood that in embodiments where a differential gear is provided, the differential ratio may be other than 50:50. An unequal ratio is relatively easy to achieve using an epicyclic differential gear, and may be useful in machinery and non-automotive applications. However most of the embodiments disclosed herein are applicable to automotive drive lines, and are particularly intended for variation of front to back, and side to side biasing of driveshaft torque. Epicyclic differential gears are generally illustrated, but conventional bevel gear differentials may be substituted in some embodiments, particularly those which do not use a double planet epicyclic gear.

Any suitable torque input device, for example driving axially or radially, may be employed.

In this specification some embodiments are described in relation to a 'between wheels' embodiment, and some are described in relation to a 'between axles' embodiment. Generally, the transmissions described are suitable for either position provided the required number of input(s)/output(s) are provided.

The transmissions described herein are typically for motor vehicles. However it will be understood that other non-automotive applications are possible, and that the input(s)/output(s) can be directed in any required direction. Furthermore, in many cases the arrangements described herein can be 'reversed', so that output(s) become input(s).

The skilled man will choose particular ratios of the epicyclic gear trains to suit the intended application, and no limitation is intended in the preferred embodiment to the particular sizes or comparative sizes of the gear elements which are illustrated.

The invention claimed is:

1. A torque biasing unit for a motor vehicle and having an input, two outputs, and therebetween an epicyclic differential module adapted to distribute torque from the input to the outputs, the unit further comprising a gear module and a control module, said gear module comprising epicyclic gear trains side by side and having a common planet carrier, the epicyclic differential module having a planet carrier, the gear module being operatively connected to the planet carrier of said epicyclic differential module, and said control module being adapted to increase and decrease the speed of the planet carrier of said gear module to bias the differential module to provide more torque to one of said outputs than to the other, wherein said differential module, gear module and control module have a common axis of rotation, and are arranged in axial series with the gear module centermost, said epicyclic differential module further comprising an annulus connected to said input and a sun connected to one of said outputs, said planet carrier of the epicyclic differential module being connected to the other of said outputs, said planet carrier of said epicyclic differential module having double planets operative in series between the annulus and sun of said epicyclic differential module, and wherein said gear module comprises first and second epicyclic gear trains side by side and having first and second suns joined for rotation in common, a first annulus of the gear module being connected to the planet carrier of said differential module, and a second annulus of the gear module being connected to one of said outputs.

2. A unit according to claim 1, wherein one of said outputs is a shaft, and the suns of said gear module are co-axial therewith.

3. A unit according to claim 2 wherein the sun of said differential module is co-axial with said suns of said gear module.

4. A unit according to claim 2 wherein the other of said outputs is a shaft, and said two outputs are co-axial.

5. A unit according to claim 4 wherein said outputs are oppositely directed.

6. A unit according to claim 1 wherein said control module comprises two disconnectable brakes and an epicyclic control module train comprising an annulus connected to said input, a sun connected to the carrier of said gear module, double planets and a planet carrier, wherein said brakes are connected one each to the planet carrier of the gear module and the planet carrier of the control module train, the brakes being operable in direct and indirect modes, in said direct mode one brake being connected to retard the carrier of said gear module, and in said indirect mode the other brake being connected to speed up the carrier of said gear module via said epicyclic control module train.

7. A unit according to claim 6 wherein the planet carrier of said epicyclic control module train is radially outside the planet carrier of said gear module.

8. A unit according to claim 6 wherein said brakes are radially one within the other.

9. A unit according to claim 8 wherein said brakes have a common grounding element radially therebetween.

10. A unit according to claim 1 wherein said control module comprises two disconnectable brakes and an epicyclic control module train comprising an annulus connected to one of said brakes, planets, a planet carrier connected to said input and a sun connected to the other of said brakes, wherein the sun of the epicyclic control module train is connected to the common planet carrier of said gear module.

11. A unit according to claim 10 wherein the planet carrier of said epicyclic control module train is radially outside the planet carrier of said gear module.

12. A unit according to claim 10 wherein said brakes are radially one within the other.

13. A unit according to claim 12 wherein said brakes have a common grounding element radially therebetween.

14. A unit according to claim 1 wherein said control module comprises two disconnectable brakes and an epicyclic control module train comprising an annulus connected to one of said brakes and the common planet carrier of said gear module, said epicyclic control module train further comprising a planet carrier connected to said input, planets, and a sun connected to the other of said brakes.

15. A unit according to claim 14 wherein the planet carrier of said epicyclic control module train is radially outside the planet carrier of said gear module.

16. A unit according to claim 14 wherein said brakes are radially one within the other.

17. A unit according to claim 16 wherein said brakes have a common grounding element radially therebetween.

* * * * *